US012572559B2

(12) United States Patent
Mankad et al.

(10) Patent No.: US 12,572,559 B2
(45) Date of Patent: Mar. 10, 2026

(54) SYSTEM AND METHOD FOR HIGHLY AVAILABLE DATABASE SERVICE

(71) Applicant: Nutanix, Inc., San Jose, CA (US)

(72) Inventors: Yashesh Mankad, Sunnyvale, CA (US); Kamaldeep Khanuja, Dublin, CA (US); Manish Pratap Singh, Cupertino, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/648,055

(22) Filed: Apr. 26, 2024

(65) Prior Publication Data

US 2024/0354313 A1      Oct. 24, 2024

Related U.S. Application Data

(63) Continuation of application No. 17/951,632, filed on Sep. 23, 2022, now Pat. No. 11,995,100, which is a
(Continued)

(51) Int. Cl.
*G06F 16/27*          (2019.01)

(52) U.S. Cl.
CPC .................................... *G06F 16/27* (2019.01)

(58) Field of Classification Search
CPC .. G06F 16/27; G06F 2201/80; G06F 2201/84; G06F 11/2094; G06F 11/2097;
(Continued)

(56) References Cited

U.S. PATENT DOCUMENTS

| | | | |
|---|---|---|---|
| 4,742,482 A | 5/1988 | Inskeep et al. |
| 6,542,893 B1 | 4/2003 | Quernemoen |

(Continued)

FOREIGN PATENT DOCUMENTS

| | | |
|---|---|---|
| EP | 2 980 707 A1 | 2/2016 |
| GB | 2 451 943 A | 2/2009 |

(Continued)

OTHER PUBLICATIONS

"About Snapshots and Clones", Administering Oracle Java Cloud Service, https://docs.oracle.com/en/cloud/paas/java-cloud/jscag/snapshots-and-clones 1.html#GUID-28871F48-A458-41C1-86F8-566ED842C3D5.
(Continued)

*Primary Examiner* — Michael Pham
(74) *Attorney, Agent, or Firm* — Foley & Lardner LLP

(57) ABSTRACT

A highly available database system includes a first instance of a database server on a first cluster of a virtual computing system, a second instance of the database server on a second cluster of the virtual computing system, a first instance of an administration database on the first cluster, and a second instance of the administration database on the second cluster. The first instance of the database server and the second instance of the database server form a highly available database server, the first instance of the administration database and the second instance of the administration database form a highly available administration database, and the first instance of the database server, the second instance of the database server, the first instance of the administration database, and the second instance of the administration database are configured to manage at least one customer database.

22 Claims, 13 Drawing Sheets

Related U.S. Application Data continuation of application No. 17/181,586, filed on Feb. 22, 2021, now Pat. No. 11,604,806.

(60) Provisional application No. 63/131,169, filed on Dec. 28, 2020.

(58) Field of Classification Search
CPC .... G06F 16/256; G06F 16/273; G06F 16/275; G06F 16/278; H04L 67/1095; H04L 67/1097; H04L 67/30; H04L 67/56; H04L 67/563; H04L 69/40
USPC ....................................................... 707/655
See application file for complete search history.

(56) References Cited

U.S. PATENT DOCUMENTS

| | | | |
|---|---|---|---|
| 6,766,477 B2 | 7/2004 | Grucci et al. |
| 7,046,134 B2 | 5/2006 | Hansen |
| 7,136,865 B1 | 11/2006 | Ra et al. |
| 7,331,000 B2 | 2/2008 | Ohno et al. |
| 7,634,679 B2 | 12/2009 | Quintiliano |
| 7,873,610 B2 | 1/2011 | Poulsen |
| 7,873,684 B2 | 1/2011 | Souder et al. |
| 7,941,470 B2 | 5/2011 | Le et al. |
| 7,971,094 B1 | 6/2011 | Benn et al. |
| 7,974,942 B2 | 7/2011 | Pomroy et al. |
| 8,146,080 B2 | 3/2012 | Carter et al. |
| 8,150,808 B2 | 4/2012 | Zha et al. |
| 8,335,765 B2 | 12/2012 | Sivasubramanian et al. |
| 8,572,031 B2 | 10/2013 | Merriman et al. |
| 8,656,123 B2 | 2/2014 | Lee |
| 8,656,303 B2 | 2/2014 | Hughes |
| 8,713,060 B2 | 4/2014 | Sivasubramanian et al. |
| 8,775,438 B1 | 7/2014 | Brooker et al. |
| 8,843,441 B1 | 9/2014 | Rath et al. |
| 8,856,189 B1 | 10/2014 | Bull et al. |
| 9,116,737 B2 | 8/2015 | Aswathanarayana et al. |
| 9,116,803 B1 | 8/2015 | Agrawal et al. |
| 9,116,862 B1 | 8/2015 | Rath et al. |
| 9,268,610 B2 | 2/2016 | Hegdal et al. |
| 9,305,068 B1 | 4/2016 | Esposito |
| 9,311,330 B1 | 4/2016 | Chockalingam et al. |
| 9,405,634 B1 | 8/2016 | Ambastha et al. |
| 9,529,808 B1 | 12/2016 | Sudarsanam et al. |
| 9,582,297 B2 | 2/2017 | Jin et al. |
| 9,621,680 B2 | 4/2017 | D'Costa et al. |
| 9,830,082 B1 | 11/2017 | Srinivasan et al. |
| 9,934,107 B1 | 4/2018 | Chikkanayakanahally et al. |
| 10,061,852 B1 | 8/2018 | Plenderleith |
| 10,078,465 B1 | 9/2018 | Wu et al. |
| 10,108,496 B2 | 10/2018 | Hoobler et al. |
| 10,162,715 B1 | 12/2018 | Mcalister et al. |
| 10,206,092 B1 | 2/2019 | Mellquist et al. |
| 10,235,250 B1 | 3/2019 | Ambastha et al. |
| 10,268,551 B1 | 4/2019 | Wong |
| 10,275,267 B1 | 4/2019 | De Kadt et al. |
| 10,379,957 B2 | 8/2019 | Ngo |
| 10,496,302 B1 | 12/2019 | Gaurav et al. |
| 10,572,292 B2 | 2/2020 | Bhandari et al. |
| 10,579,364 B2 | 3/2020 | Doshi et al. |
| 10,705,755 B2 | 7/2020 | Wang et al. |
| 10,824,522 B2 | 11/2020 | Sadavarte et al. |
| 10,855,554 B2 | 12/2020 | Freeman et al. |
| 10,922,957 B2 | 2/2021 | Rhoads et al. |
| 10,965,737 B1 | 3/2021 | Parulkar et al. |
| 11,010,336 B2 | 5/2021 | Kuchibhotla et al. |
| 11,036,696 B2 | 6/2021 | Higginson et al. |
| 11,055,352 B1 | 7/2021 | Beitchman et al. |
| 11,061,709 B2 | 7/2021 | Cao et al. |
| 11,099,956 B1 * | 8/2021 | Polimera ............. G06F 11/2069 |
| 11,100,020 B2 | 8/2021 | Shah et al. |
| 11,120,011 B2 | 9/2021 | Priebe et al. |
| 11,169,887 B2 | 11/2021 | Bajaj et al. |
| 11,182,372 B1 | 11/2021 | Jain et al. |
| 11,243,703 B2 | 2/2022 | Watkins |
| 11,308,114 B1 | 4/2022 | Moghe |
| 11,561,864 B1 | 1/2023 | Brahmadesam et al. |
| 11,604,705 B2 | 3/2023 | Mehta et al. |
| 11,609,828 B2 | 3/2023 | Khandkar et al. |
| 11,640,340 B2 | 5/2023 | Sontakke et al. |
| 11,741,380 B2 | 8/2023 | Khawas et al. |
| 11,816,066 B2 | 11/2023 | Kuchibhotla et al. |
| 11,860,818 B2 | 1/2024 | Kuchibhotla et al. |
| 11,892,918 B2 | 2/2024 | Rayaraddi et al. |
| 11,899,685 B1 | 2/2024 | Pandis et al. |
| 12,010,227 B1 | 6/2024 | Chhabra et al. |
| 12,019,523 B2 | 6/2024 | Mehta et al. |
| 12,081,604 B1 | 9/2024 | Hinds et al. |
| 12,093,715 B2 | 9/2024 | Zhao et al. |
| 12,321,244 B1 | 6/2025 | Rather et al. |
| 2002/0019920 A1 | 2/2002 | Reuter et al. |
| 2002/0038554 A1 | 4/2002 | Monk et al. |
| 2002/0082858 A1 | 6/2002 | Heddaya et al. |
| 2003/0046353 A1 | 3/2003 | Chung et al. |
| 2004/0059878 A1 | 3/2004 | Madany |
| 2005/0027661 A1 | 2/2005 | Lober et al. |
| 2006/0029096 A1 | 2/2006 | Babbar et al. |
| 2006/0107006 A1 | 5/2006 | Green et al. |
| 2006/0161462 A1 | 7/2006 | Sharma |
| 2006/0161879 A1 | 7/2006 | Lubrecht et al. |
| 2006/0242189 A1 | 10/2006 | Leetaru et al. |
| 2006/0253472 A1 | 11/2006 | Wasserman et al. |
| 2008/0059894 A1 | 3/2008 | Cisler et al. |
| 2008/0239985 A1 | 10/2008 | Karve et al. |
| 2009/0161547 A1 | 6/2009 | Riddle et al. |
| 2009/0276771 A1 | 11/2009 | Nickolov et al. |
| 2009/0276833 A1 | 11/2009 | Paul et al. |
| 2009/0319582 A1 | 12/2009 | Simek et al. |
| 2010/0017801 A1 | 1/2010 | Kundapur |
| 2010/0251242 A1 | 9/2010 | Sivasubramanian et al. |
| 2011/0099420 A1 | 4/2011 | MacDonald McAlister et al. |
| 2011/0138383 A1 | 6/2011 | Le |
| 2012/0084260 A1 | 4/2012 | Cherkauer et al. |
| 2013/0019015 A1 | 1/2013 | Devarakonda et al. |
| 2013/0031136 A1 | 1/2013 | Shah |
| 2013/0110779 A1 | 5/2013 | Taylor et al. |
| 2013/0232470 A1 | 9/2013 | Yung |
| 2013/0232497 A1 | 9/2013 | Jalagam et al. |
| 2013/0238331 A1 | 9/2013 | Mikan et al. |
| 2013/0263119 A1 | 10/2013 | Pissay et al. |
| 2013/0332251 A1 | 12/2013 | Ioannidis et al. |
| 2014/0018947 A1 | 1/2014 | Ales |
| 2014/0108339 A1 | 4/2014 | Marsden |
| 2014/0229504 A1 | 8/2014 | Kim et al. |
| 2014/0229698 A1 | 8/2014 | Sivasubramanian et al. |
| 2014/0250081 A1 | 9/2014 | Stewart et al. |
| 2014/0337844 A1 | 11/2014 | Jin et al. |
| 2015/0127611 A1 | 5/2015 | Westerman et al. |
| 2015/0188775 A1 | 7/2015 | Van Der Walt |
| 2015/0188789 A1 | 7/2015 | Jayaprakash |
| 2015/0207682 A1 | 7/2015 | Moraes Nichele et al. |
| 2015/0207683 A1 | 7/2015 | Adogla |
| 2015/0207703 A1 | 7/2015 | Gallagher et al. |
| 2015/0254141 A1 | 9/2015 | Wertheimer et al. |
| 2015/0339941 A1 | 11/2015 | Lu |
| 2016/0057077 A1 | 2/2016 | Gomatam et al. |
| 2016/0066201 A1 | 3/2016 | Kerpez et al. |
| 2016/0077925 A1 | 3/2016 | Tekade et al. |
| 2016/0094401 A1 | 3/2016 | Anwar et al. |
| 2016/0094410 A1 | 3/2016 | Anwar et al. |
| 2016/0094647 A1 | 3/2016 | Mordani et al. |
| 2016/0182328 A1 | 6/2016 | Bhasin et al. |
| 2016/0188421 A1 | 6/2016 | Karinta et al. |
| 2016/0191348 A1 | 6/2016 | Lee et al. |
| 2016/0239637 A1 | 8/2016 | Miller et al. |
| 2016/0246503 A1 | 8/2016 | Phelan et al. |
| 2016/0248629 A1 | 8/2016 | Erdmann et al. |
| 2016/0266913 A1 | 9/2016 | Achillopoulos |
| 2016/0306840 A1 | 10/2016 | Deshmukh et al. |
| 2016/0335369 A1 | 11/2016 | Picard et al. |
| 2016/0344582 A1 | 11/2016 | Shivanna et al. |
| 2016/0378361 A1 | 12/2016 | Uriel |
| 2017/0031775 A1 | 2/2017 | Arumugham et al. |

(56) References Cited

U.S. PATENT DOCUMENTS

| | | | |
|---|---|---|---|
| 2017/0039236 | A1 | 2/2017 | Li et al. |
| 2017/0068469 | A1 | 3/2017 | Shankar et al. |
| 2017/0091231 | A1 | 3/2017 | Difranco et al. |
| 2017/0199753 | A1 | 7/2017 | Gong |
| 2017/0228227 | A1 | 8/2017 | Winterfeldt et al. |
| 2017/0235563 | A1 | 8/2017 | Bafna et al. |
| 2017/0243275 | A1 | 8/2017 | Goens et al. |
| 2017/0262232 | A1 | 9/2017 | Zhao et al. |
| 2017/0272359 | A1 | 9/2017 | Behringer et al. |
| 2017/0315877 | A1 | 11/2017 | Kaplingat et al. |
| 2017/0344618 | A1 | 11/2017 | Horowitz et al. |
| 2017/0357667 | A1 | 12/2017 | Auch et al. |
| 2017/0371547 | A1 | 12/2017 | Fruchtman et al. |
| 2018/0060119 | A1 | 3/2018 | Zamir |
| 2018/0063088 | A1 | 3/2018 | Hardy |
| 2018/0113622 | A1 | 4/2018 | Sancheti |
| 2018/0121521 | A1 | 5/2018 | Bivol |
| 2018/0173452 | A1 | 6/2018 | Hu et al. |
| 2018/0203771 | A1 | 7/2018 | Heidel et al. |
| 2018/0232142 | A1 | 8/2018 | Shekar et al. |
| 2018/0270219 | A1 | 9/2018 | Li |
| 2018/0285353 | A1 | 10/2018 | Ramohalli Gopala Rao et al. |
| 2018/0293397 | A1 | 10/2018 | Demember et al. |
| 2018/0300203 | A1 | 10/2018 | Kathpal et al. |
| 2018/0324279 | A1 | 11/2018 | Barton et al. |
| 2019/0116237 | A1 | 4/2019 | Gibson |
| 2019/0121671 | A1 | 4/2019 | Guim Bernat |
| 2019/0179711 | A1 | 6/2019 | Luo et al. |
| 2019/0182213 | A1 | 6/2019 | Saavedra et al. |
| 2019/0238412 | A1 | 8/2019 | Vohra et al. |
| 2019/0238520 | A1 | 8/2019 | Espinosa et al. |
| 2019/0245704 | A1 | 8/2019 | Pala |
| 2019/0324865 | A1 | 10/2019 | Weissman et al. |
| 2019/0349194 | A1 | 11/2019 | Fan |
| 2019/0361412 | A1 | 11/2019 | Park et al. |
| 2019/0361748 | A1 | 11/2019 | Walters et al. |
| 2019/0370146 | A1 | 12/2019 | Babu et al. |
| 2020/0028932 | A1 | 1/2020 | Yang et al. |
| 2020/0042293 | A1 | 2/2020 | Elango et al. |
| 2020/0050522 | A1* | 2/2020 | Coleman ............. G06F 11/2041 |
| 2020/0097325 | A1 | 3/2020 | Vadapandeshwara et al. |
| 2020/0162380 | A1 | 5/2020 | Pilkington et al. |
| 2020/0314173 | A1 | 10/2020 | Pahwa et al. |
| 2020/0351332 | A1 | 11/2020 | Palladino et al. |
| 2020/0366661 | A1 | 11/2020 | Mehta et al. |
| 2021/0005330 | A1 | 1/2021 | Patil et al. |
| 2021/0051530 | A1 | 2/2021 | Venkataraman et al. |
| 2021/0064591 | A1 | 3/2021 | Sun et al. |
| 2021/0075700 | A1 | 3/2021 | Palladino et al. |
| 2021/0135983 | A1 | 5/2021 | Farnham |
| 2021/0141921 | A1 | 5/2021 | Toplak |
| 2021/0141923 | A1 | 5/2021 | Wu et al. |
| 2021/0194825 | A1 | 6/2021 | Goodman et al. |
| 2021/0281428 | A1 | 9/2021 | Kempf et al. |
| 2021/0328979 | A1 | 10/2021 | Sivakumar |
| 2021/0391999 | A1 | 12/2021 | Chilamakuri et al. |
| 2021/0400533 | A1 | 12/2021 | Kwok |
| 2021/0406132 | A1 | 12/2021 | Gupta et al. |
| 2022/0004469 | A1 | 1/2022 | Shen et al. |
| 2022/0050753 | A1 | 2/2022 | Mehta et al. |
| 2022/0066993 | A1 | 3/2022 | Khanuja et al. |
| 2022/0116445 | A1 | 4/2022 | Filippou et al. |
| 2022/0311681 | A1 | 9/2022 | Palladino et al. |
| 2022/0351169 | A1 | 11/2022 | Kim et al. |
| 2022/0417205 | A1 | 12/2022 | Nainar et al. |
| 2023/0065444 | A1 | 3/2023 | Pyla et al. |
| 2023/0108625 | A1 | 4/2023 | Yi et al. |
| 2023/0115093 | A1 | 4/2023 | Zhou |
| 2023/0125754 | A1 | 4/2023 | Willett et al. |
| 2023/0164567 | A1 | 5/2023 | Fellows et al. |
| 2023/0214305 | A1 | 7/2023 | Hockey et al. |
| 2023/0216736 | A1 | 7/2023 | Almadani et al. |
| 2023/0231912 | A1 | 7/2023 | Vohra et al. |
| 2023/0247087 | A1 | 8/2023 | Nagaraja et al. |
| 2023/0251938 | A1 | 8/2023 | Sontakke et al. |
| 2023/0344885 | A1 | 10/2023 | Arnold et al. |
| 2023/0379699 | A1 | 11/2023 | Oerton et al. |
| 2023/0418639 | A1 | 12/2023 | Vaishnav et al. |
| 2024/0045834 | A1 | 2/2024 | Kuchibhotla et al. |
| 2024/0126777 | A1 | 4/2024 | Tylik et al. |
| 2024/0134824 | A1 | 4/2024 | Khanuja et al. |
| 2024/0161006 | A1 | 5/2024 | Dey et al. |

FOREIGN PATENT DOCUMENTS

| | | |
|---|---|---|
| WO | WO-2010/106578 | 9/2010 |
| WO | WO-2020/026476 A1 | 2/2020 |

OTHER PUBLICATIONS

"Cloning a volume for an Amazon Aurora DB cluster", https://docs. aws.amazon.com/AmazonRDS/latest/AuroraUserGuide/Aurora. Managing.Clone.html.

"Dell PS Series Snapshots and Clones: Best Practices and Sizing Guidelines", Dell Storage Engineering, Nov. 2019, https://dl.dell. com/manuals/common/ps-series-snapshots-clones-bp1027_en-us. pdf.

"Enterprise Manager Cloud Administration Guide", Oracle Help Center, 2024, https://docs.oracle.com/cd/E24628_01/doc.121/e28814/ cloud_db_clonesnap.htm#CEGCJCBC.

"Protecting Microsoft SQL Server with Rubrik", Rubrik Technical Marketing, Sep. 2023, https://www.rubrik.com/content/dam/rubrik/ en/resources/white-paper/rwp-protecting-microsoft-sql-server-with-rubrik.pdf.

Maruthachalam, et al., "A Distributed System Design for Next Generation Storage and Remote Replication", 2014, https://ieeexplore. ieee.org/abstract/document/6814686.

Affidavit of Nathaniel E Frank-White, Aug. 10, 2024.

New Oxford American Dictionary, Third Edition, "authorized—avail", 4 pages, 2010.

*Nutanix* v. *Tessell,* "Order Setting initial Case Management Conference and ADR Deadlines", Northern District of California, Mar. 20, 2024.

"Creating Instances," Google Cloud ("Google") (Wayback Machine Capture, Sep. 18, 2018), available at https://www.archive.org/web/ 20180918103721/https://cloud.google.com/sql/docs/mysql/create-instance.

“Nutanix Era: Databases Made Simple,” as archived by the Internet Archive on Sep. 26, 2020, available at http://web. archive.org/web/20200926222827/https://nutanix.com/blog/nutanix-era-databases-made-simple (1 of 3).

“Taking a Backup Using Snapshots” (“LVM-Howto”) (Wayback Machine Capture, Jan. 20, 2007), available at https://web.archive.org/web/20070120200004/https:// tidp.org/HOWTO/LVM-HOWTO/snapshots_backup.html (2 of 3).

“Windows Geo-Clustering: SQL Server, ” published Oct. 12, 2014 (3 of 3).

7 more ways to Query Always on Availability Groups, as archived by the Internet Archive on Mar. 30, 2019, available at https://web. archive.org/web/20190330182441/https://sqlundercover.com/2019/ 02/19/7-more-ways-to-query-always-on-availability-groups/.

Amazon Relational Database Service User Guide (2016) (“RDS ”) (Wayback Machine Capture, Apr. 12, 2016), available at https://web.archive.org/web/20160412105355/http://docs.aws.amazon. com/AmazonRDS/latest/UserGuide/rds-ug.pdf.

Order Granting Defendant’s Motion to Compel Arbitration (staying the remaining claims) in *Nutanix, Inc.* v. *Tessell, Inc.,* Case No. 3:24-cv-01729 (N.D. Cal. Mar. 20, 2024).

SQL Server AlwaysOn Availability Group Backup Preference Setting, as archived by the Internet Archive on Sep. 25, 2020, available at https://www.mssqltips.com/sqlservertip/4976/sql-server-alwayson-availability-group-backup-preference-setting/.

The American Heritage Dictionary of the English Language (5th ed. 2011) ("Heritage").

Use the Availability Group Wizard (SQL Server Management Studio), as archived by the Interne Archive on Jan. 20, 2020, available at https://web.archive.org/web/20200120100053/https://

(56)             References Cited

OTHER PUBLICATIONS docs.microsoft.com/en-us/sql/database-engine/availability-groups/ windows/use-the-availability-group-wizard-sql-server-management-studio?view=sql-server-ver15.

Using Oracle Database Cloud Service – Creating a Database Deployment (2017) (“Oracle”) (Wayback Machine Capture, Jan. 18, 2017), available at https://web.archive. org/web/20170118071307/https://docs.oracle.com/en/cloud/paas/ database-dbaascloud/csdbi/create-db-deployment.html.

BackupAssist, "https://secure.backupassist.com/support/en/backupassist/ manage/calendar.htm" ; "https://secure.backupassist.com/ support/ en/references/backup-schedules.htm", Jul. 1, 2017 (Year: 2017).

Oracle, "https://web.archive.org/web/20170829005212/https://docs. oracle.com/cd/E24628_011em.121/e27046/cloning_database. htm#EMLCM93230", Aug. 29, 2017 (Year: 2017).

Communication under Rule 71(3) EPC for EP application 23159241. 1, Oct. 2, 2025.

"Recommended Practice for Patch Management of Control Systems", Steven Tom, Idaho National Laboratory, Dec. 2008, Cybersecurity Infrastructure Security Agency (Cisa), US. Department of Homeland Security (Year: 2008).

High availability software—Wikipedia (Year: 2016).

* cited by examiner

400

500

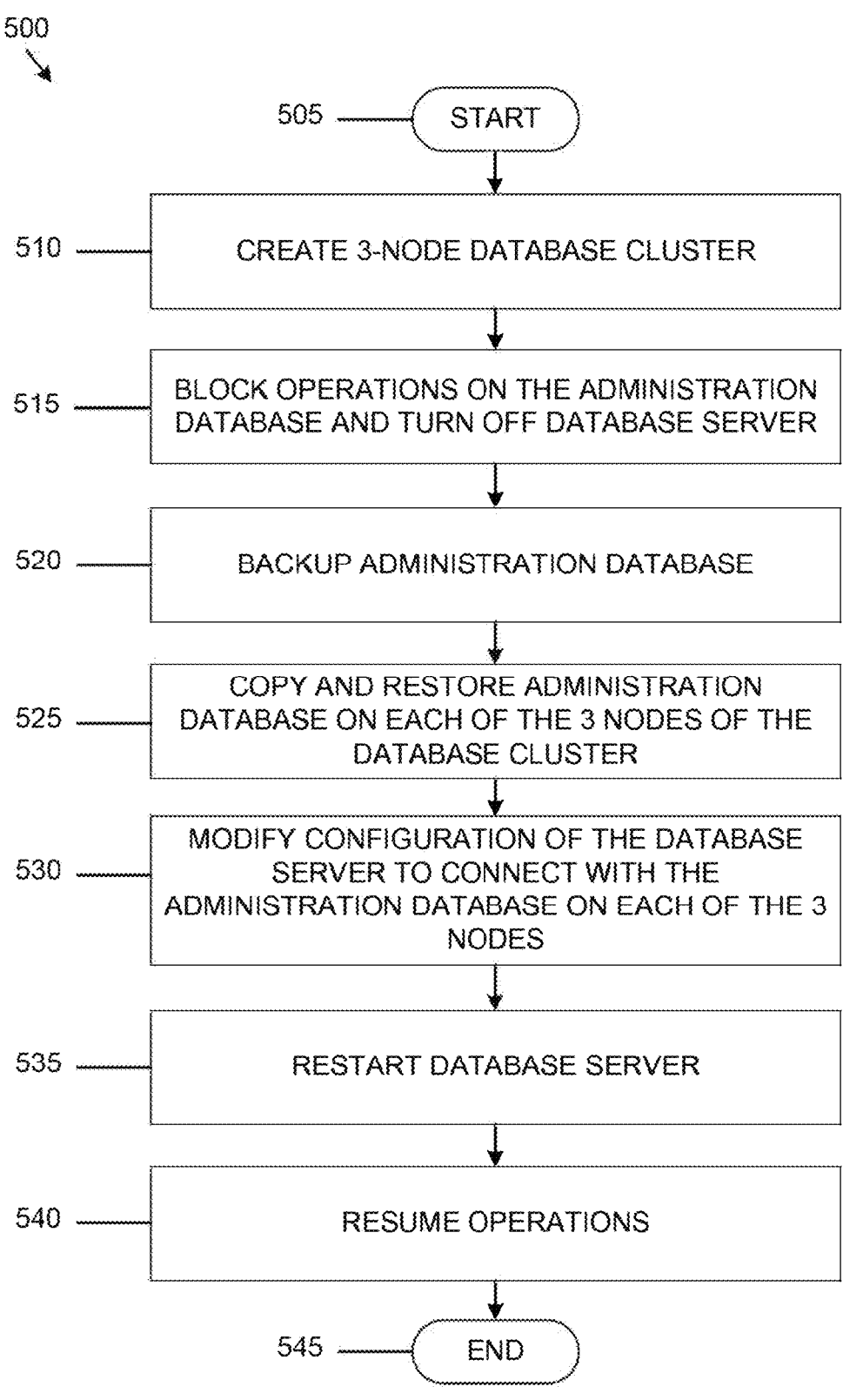

505 —— ( START )

510 —— CREATE 3-NODE DATABASE CLUSTER

515 —— BLOCK OPERATIONS ON THE ADMINISTRATION DATABASE AND TURN OFF DATABASE SERVER

520 —— BACKUP ADMINISTRATION DATABASE

525 —— COPY AND RESTORE ADMINISTRATION DATABASE ON EACH OF THE 3 NODES OF THE DATABASE CLUSTER

530 —— MODIFY CONFIGURATION OF THE DATABASE SERVER TO CONNECT WITH THE ADMINISTRATION DATABASE ON EACH OF THE 3 NODES

535 —— RESTART DATABASE SERVER

540 —— RESUME OPERATIONS

545 —— ( END )

FIG. 5

SYSTEM AND METHOD FOR HIGHLY AVAILABLE DATABASE SERVICE

CROSS-REFERENCE TO RELATED PATENT APPLICATIONS

This application is a Continuation of U.S. patent application Ser. No. 17/951,632, filed on Sep. 23, 2022, entitled "SYSTEM AND METHOD FOR HIGHLY AVAILABLE DATABASE SERVICE" which is a Continuation of U.S. patent application Ser. No. 17/181,586, filed on Feb. 22, 2021, entitled "SYSTEM AND METHOD FOR HIGHLY AVAILABLE DATABASE SERVICE" which is related to and claims priority under 35 U.S. § 119 (e) from U.S. Provisional Application No. 63/131,169, filed Dec. 28, 2020, titled "SYSTEM AND METHOD FOR HIGHLY AVAILABLE DATABASE SERVICE," the entire contents of which are incorporated herein by reference for all purposes.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a system is disclosed. The system includes a first instance of a database server on a first cluster of a virtual computing system, a second instance of the database server on a second cluster of the virtual computing system, a first instance of an administration database on the first cluster, and a second instance of the administration database on the second cluster. The first instance of the database server and the second instance of the database server form a highly available database server, the first instance of the administration database and the second instance of the administration database form a highly available administration database, and the first instance of the database server, the second instance of the database server, the first instance of the administration database, and the second instance of the administration database are configured to manage at least one customer database.

In accordance with some other aspects of the present disclosure, a method is disclosed. The method includes creating, by a processor executing computer-readable instructions stored on a memory, a highly available administration database by creating, by the processor, a first instance of an administration database on a first cluster of a virtual computing system and creating, by the processor, a second instance of the administration database on a second cluster of the virtual computing system. The method further includes creating, by the processor, a highly available database server by creating, by the processor, a first instance of a database server on the first cluster and creating, by the processor, a second instance of the database server on the second cluster. The first instance of the database server, the second instance of the database server, the first instance of the administration database, and the second instance of the administration database are configured to manage at least one customer database.

In accordance with yet other aspects of the present disclosure, a non-transitory computer-readable media having computer-readable instructions stored thereon is disclosed. The computer-readable instructions when executed by a processor cause the processor to create a highly available administration database by creating a first instance of an administration database on a first cluster of a virtual computing system and creating a second instance of the administration database on a second cluster of the virtual computing system. The computer-readable instructions also cause the processor to create a highly available database server by creating a first instance of a database server on the first cluster and creating a second instance of the database server on the second cluster. The first instance of the database server, the second instance of the database server, the first instance of the administration database, and the second instance of the administration database are configured to manage at least one customer database.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 5 is another example flowchart outlining operations for providing a highly available repository in the database management systems of FIG. 3, in accordance with some embodiments of the present disclosure.

Figure 1:
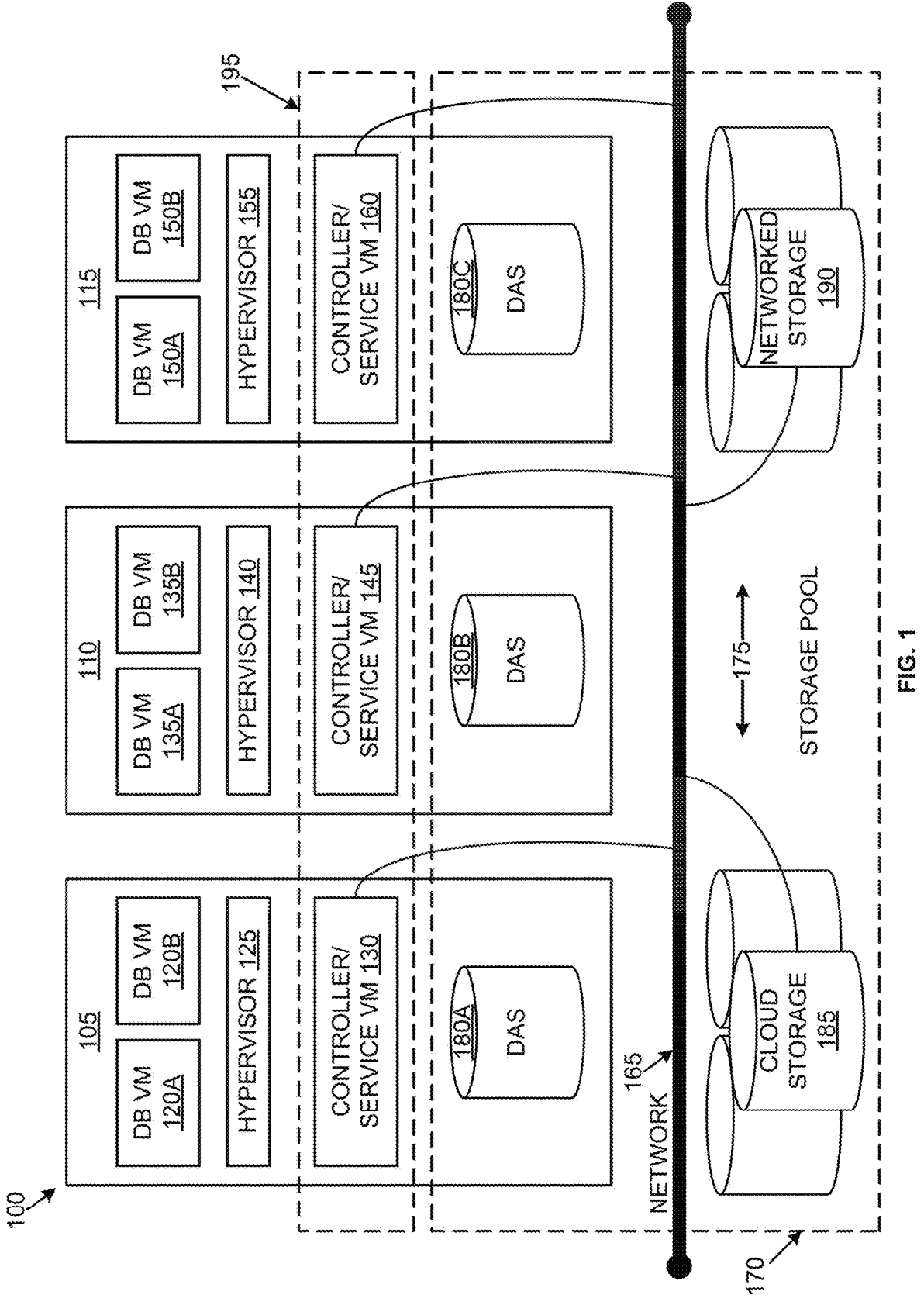
FIG. 1 is an example block diagram of a cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a hyper-converged virtual computing system having a plurality of clusters, with each of the plurality of clusters having a plurality of nodes. Each of the plurality of nodes includes one or more virtual machines and other entities managed by an instance of a monitor such as a hypervisor. These and other components may be part of a datacenter, which may be managed by a user (e.g., an administrator or other authorized personnel). A distributed storage system, for providing storage and protection capabilities, may be associated with the virtual computing system and shared at least partially by each of the plurality of nodes. The virtual computing system may be configured for providing database management services.

In some embodiments, a user may enter into a Service Level Agreement ("SLA") with a provider of the database management services. The SLA may define conditions for maintaining continuity of operation of the database management services in the aftermath of a disaster condition. For example, the SLA may specify a variety of performance related requirements/parameters for the provider of the database management services to satisfy. For example, one such performance parameter may be a Recovery Time Objective ("RTO"). RTO is measured forward in time from the moment a disaster condition occurs and is indicative of the time when a particular resource (e.g., user VM, cluster, database, etc.) is back up and running. In other words, RTO specifies the amount of downtime from the time a disaster condition strikes that a resource will be inoperative. Lower RTOs are desirable. RTO's may be measured in seconds, minutes, hours, or other units of time. Another performance parameter in the SLA may be Recovery Point Objective ("RPO"). RPO is measured backward in time from the moment a disaster condition strikes. RPO is indicative of a resource's recovery time point. In other words, RPO determines how often data needs to be backed up that may otherwise be lost due to the disaster condition. RPO is also measured in units of time. Again, smaller RPOs are desired. For example, smaller the RPO, smaller is the amount of data lost, and therefore, data needs to be backed up less frequently. The SLA may specify other or additional parameters as well. Thus, based upon the user's requirements for continuity of operation, the user's SLA with the provider of the database management services may vary.

A disaster condition may include planned outages, performance related failures, component failures, power failures, natural calamities, or any other condition that hampers the normal operation of the clusters at the client sites. Generally speaking, and as used herein, a disaster condition is any condition that causes hardware, software, and/or firmware failure or otherwise prevents a component from operating as intended, or results in a downtime at the client site. For example, a condition that causes a malfunction of any cluster at a client site or that significantly hampers the normal operation of any clusters is referred to as a disaster condition. The disaster condition may trigger a failover event. When the downtime of the client site is preplanned, the failover event may be a planned failover event. When the downtime is not preplanned, the failover event may be an unplanned failover event.

In some embodiments, to abide by the SLA, the provider of the database management services may provide high availability. To provide high availability of a resource, that resource may be replicated/duplicated. For example, the user may desire high availability of a database that stores the user's data (also referred to herein as customer database or user database). In such a case, the customer database may be replicated/duplicated into multiple locations, such that if one location experiences a disaster condition, the customer database may be accessed from another location to maintain a continuity of operation for the user. Even if the customer database may be highly available, in some embodiments, continuity of operation may only be maintained in so far as the database service that provides the database management service remains available. In some embodiments, the database service may include a combination of a database server (also referred to herein as API server, ERA server, ERA service, and the like) and a repository. The repository may store the metadata associated with the database server and other information needed by the database server to provide the database management services, as well as manage the customer databases. In some embodiments, even if the customer database is highly available, if either the repository or the database server becomes unavailable, the customer database may become inaccessible and database management services may not be performed on the customer database. Thus, even with a highly available customer database, the customer database remains vulnerable.

The present disclosure provides technical solutions that provide true high availability to the customer database. Specifically, the present disclosure provides a mechanism by which the repository and/or the database server may also be made highly available. Making the repository and/or the database server highly available is more complicated than creating a highly available customer database, as discussed in greater detail below. By making the repository and/or the database server highly available, the present disclosure provides significant improvements in computer related technology such as computer networks and database management systems. For example, the present disclosure provides improved or increased high availability, thereby ensuring that database management services maintain continuity of operation in case of a disaster condition even when an instance of the database server and/or repository is down due to a disaster condition. Further, by virtue of making the database server and/or the repository highly available, the present disclosure allows the provider of the database management services to offer improved SLA features (e.g., reduced RPO and RTO), minimize downtime of operations, increased customer satisfaction, and improved database management systems.

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database VMs") 120A and 120B (collectively referred to herein as "database VMs 120"), a hypervisor 125 configured to create and run the database VMs, and a controller/service VM 130 configured to manage, route, and otherwise handle workflow requests between the various nodes of the cluster 100. Similarly, the second node 110 includes database VMs 135A and 135B (collectively referred to herein as "database VMs 135"), a hypervisor 140, and a controller/service VM 145, and the third node 115 includes database VMs 150A and 150B (collectively referred to herein as "database VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Although the hypervisor 125, the hypervisor 140, and the hypervisor 155 are shown herein, in other embodiments, other types of virtual monitors may be used instead. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database VMs (e.g., the database VMs 120, the database VMs 135, the database VMs 150) are shown on each of the first node 105, the second node 110, and the third node 115, in other embodiments, the number of the database VMs on each of the first, second, and third nodes may vary to include other numbers of database VMs. Further, the first node 105, the second node 110, and the third node 115 may have the same number of database VMs (e.g., the database VMs 120, the database VMs 135, the database VMs 150) or different number of database VMs.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processors configured to execute instructions. The instructions may be carried out by a special purpose computer, logic circuits, or hardware circuits of the first node 105, the second node 110, and the third node 115. The processors may be implemented in hardware, firmware, software, or any combination thereof. The term "execution" is, for example, the process of running an application or the carrying out of the operation called for by an instruction. The instructions may be written using one or more programming language, scripting language, assembly language, etc. The processors, thus, execute an instruction, meaning that they perform the operations called for by that instruction.

The processors may be operably coupled to the storage pool 170, as well as with other elements of the first node 105, the second node 110, and the third node 115 to receive, send, and process information, and to control the operations of the underlying first, second, or third node. The processors may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processors may execute instructions without first copying the instructions to the RAM. Further, the processors may include a single stand-alone processor, or a plurality of processors that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the database VMs 120, the database VMs 135, and the database VMs 150.

Each of the database VMs 120, the database VMs 135, the database VMs 150 is a software-based implementation of a computing machine. The database VMs 120, the database VMs 135, the database VMs 150 emulate the functionality of a physical computer. Specifically, the hardware resources, such as processor, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database VMs 120, the database VMs 135, the database VMs 150 that may run its own operating system and applications on the underlying physical resources just like a real computer. By encapsulating an entire machine, including CPU, memory, operating system, storage devices, and network devices, the database VMs 120, the database VMs 135, the database VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database VMs 120, the database VMs 135, and the database VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the database VMs 120, the database VMs 135, the database VMs 150A, and the database VMs 150B) from the storage pool 170 to perform one or more functions.

By running the database VMs 120, the database VMs 135, and the database VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 105, the second node 110, and the third node 115, each of the new database VMs may be configured to be associated with certain hardware resources, software resources, storage resources, and other resources within the cluster 100 to allow those virtual VMs to operate as intended.

The database VMs 120, the database VMs 135, the database VMs 150, and any newly created instances of the database VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the database VMs 120, the database VMs 135, and the database VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the database VMs 120, the database VMs 135, the database VMs 150A, and the database VMs 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database VM (e.g., the database VMs 120, the database VMs 135, or the database VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
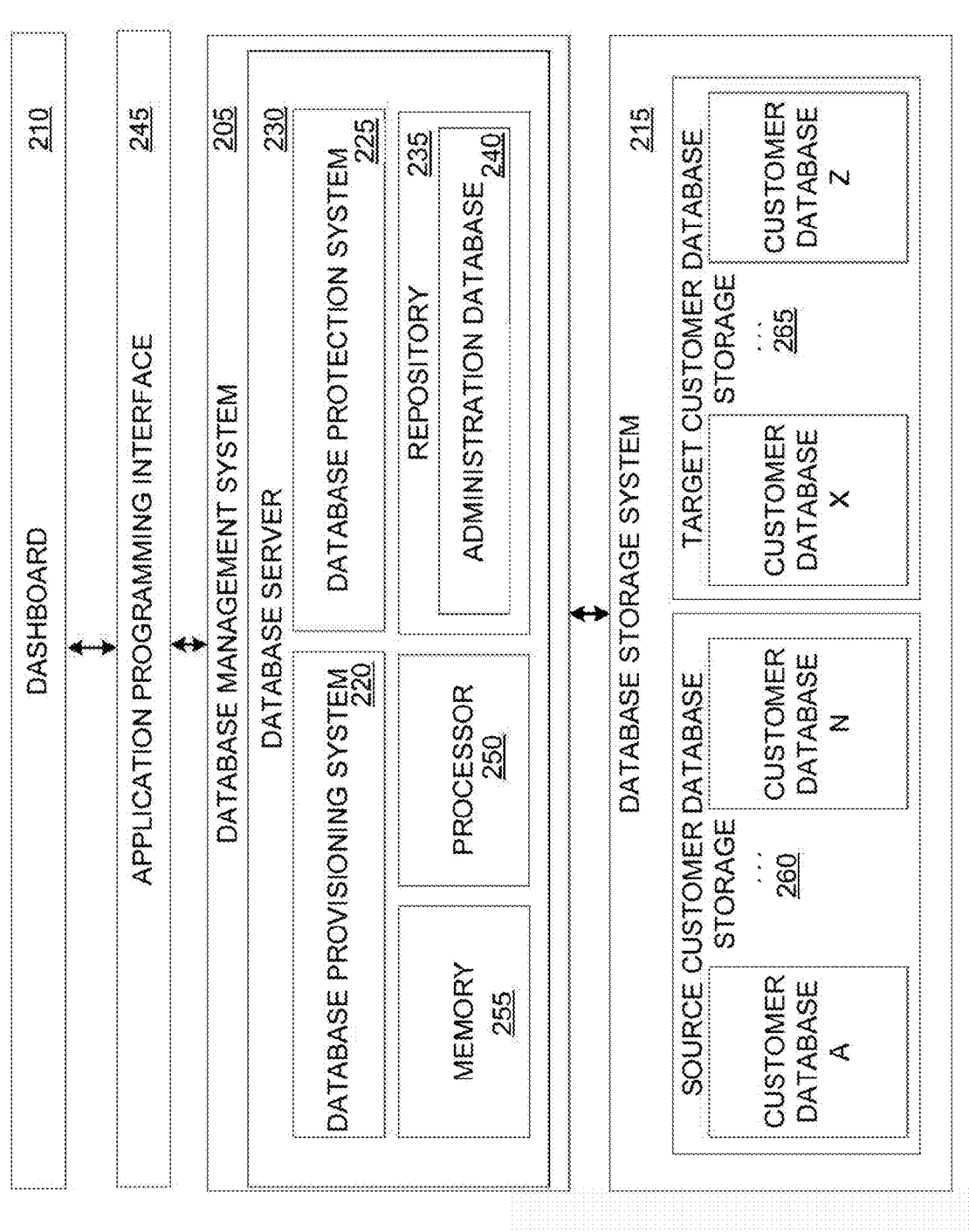
FIG. 2 is an example block diagram of a database system of the virtual computing system of FIG. 1, in accordance with some embodiments of the present disclosure.

Turning now to FIG. 2, an example block diagram of a database system 200 is shown, in accordance with some embodiments of the present disclosure. FIG. 2 is discussed in conjunction with FIG. 1. The database system 200 or portions thereof may be configured as utility software for creating and implementing database management services. The database system 200 is configured to facilitate creation/registration, protection, querying, and/or administration of customer databases associated therewith. In other words, the database system 200 is configured to provide a variety of database services or database management services related to the customer databases associated therewith. Thus, the database system 200 includes a database management system 205 (e.g., database service) that is configured to receive input from and provide output to a user via a dashboard 210. The database management system 205 is also associated with a database storage system 215 that is configured to store one or more customer databases under management of the database system 200. In association with the dashboard 210 and the database storage system 215, the database management system 205 is configured to implement one or more database management services of the database system 200. For example, the database management system 205 may be configured to provide database provisioning services to create new customer databases and register existing customer databases with the database system 200 using a database provisioning system 220. The database management system 205 may also be configured to protect customer databases created or registered by the database provisioning system 220 via a database protection system 225. The database management system 205 may be configured to provide other or additional types of database management services as well. Additional details of the database provisioning services and the database protection services are described in U.S. application Ser. No. 16/228,728, filed on Dec. 20, 2018, the entirety of which is incorporated by reference herein.

Although the database provisioning system 220 and the database protection system 225 are shown as separate components, in some embodiments, the database provisioning system and the database protection system may be combined, and the combined component may perform the operations of the individual components. Although not shown, the database management system 205 may include other or additional components that provide other or additional database management services. The database management services (e.g., the provisioning services, protection services, etc. mentioned above) may particularly be executed by a database server 230 of the database management system 205. Thus, in some embodiments, the database server 230 may implement the database provisioning system 220, the database protection system 225, and any other system providing database management services to the customer databases stored in the database storage system 215.

The database server 230 may be installed on a database VM (e.g., the database VMs 120, the database VMs 135, the database VMs 150 of FIG. 1). In some embodiments, the database server 230 may be installed via the controller/service VM (e.g., the controller/service VM 130, the controller/service VM 145, the controller/service VM 160) of the node (e.g., the first node 105, the second node 110, and the third node 115) on which the database server is to be installed. For example, an administrator desiring to install the database server 230 may download a copy on write image file (e.g., qcow or qcow2 image file) on the controller/service VM to define the content and structure of a disk volume to be associated with the database server 230. In some embodiments, instead of a copy on write image file, another type of disk image file, depending upon the type of underlying hypervisor, may be installed. Further, the administrator may create a new database VM on the node on which the database server 230 is to reside. As part of creating the new database VM, the administrator may allocate a particular number of virtual central processors (vCPU) to each of the database VMs, define the number of cores that are desired in each vCPU, designate a specific amount of memory to each of the database VMs, attach a database storage device (e.g., a virtual disk from the storage pool 170) with the database VM, and allocate other compute resources. In some embodiments, allocation of these compute resources (e.g., CPU, memory, etc.) may be provided by a compute profile. Thus, a compute profile may define the size/configuration of the database VM on which the database server 230 is to reside. In some embodiments, a default compute profile (e.g., 2 vCPU, 4 GB) may be defined for the database server 230. In other embodiments, the administrator may select the compute profile from a list of available compute profiles. In some embodiments, a custom compute profile may be defined by the administrator.

In some embodiments, the administrator may also create a new network interface (e.g., associate a virtual local area network (VLAN), assign an Internet Protocol ("IP") address to access the database server 230, etc.) the database VM. Such network related details may be provided via a network profile. Thus, a network profile may identify the network location of the database VM on which the database server 230 is to reside. In some embodiments, a default network profile may be defined for the database server 230. In other embodiments, the administrator may select the network profile from a list of available network profiles. In some embodiments, a custom network profile may be defined by the administrator.

Further, in some embodiments, the administrator may also provide a software profile for the database VM of the database server 230. A software profile may define the software and operating system parameters for the database server 230. For example, in some embodiments, the software profile may include one or more software and operations system image profiles associated with a particular database engine that the is associated with the database system 200. Each software profile may define the rules that are to be applied in performing the various database management services. In some embodiments, a default software profile may be defined for the database server 230. In other embodiments, the administrator may select the software profile from a list of available software profiles. In some embodiments, a custom software profile may be defined by the administrator.

In addition to defining a compute profile, a network profile, and a software profile for the database server 230, in some embodiments, the administrator may also define a database parameter profile for the database server 230. A database parameter profile may define custom parameters (e.g., database configurations such as maximum allowed connections from clients, number of shared buffers, compaction intervals, etc.) that are applied to the database server 230. In some embodiments, a default database parameter profile may be defined for the database server 230. In other embodiments, the administrator may select the database parameter profile from a list of available database parameter profiles. In some embodiments, a custom database parameter profile may be defined by the administrator. In some embodiments, the database parameter profile (e.g., the database configuration and parameters) may be dynamically/automatically adjusted depending upon the amount of memory (and/or other compute resources) provided to the database VM of the database server 230.

Thus, the administrator may define one or more of the compute profile, the network profile, the software profile, and the database parameter profile for the database VM of the database server 230. The administrator may perform additional and/or other actions to create the database VM on which the database server 230 resides upon creation and installation of the disk image file. In some embodiments, in addition to the creation of the database VM for the database server 230 and installing the database server on the database VM, the dashboard 210 may need to be installed. In some embodiments, the installation of the database server 230 may also install the dashboard 210. In other embodiments, the dashboard 210 may need to be separately installed from the database server 230. Whether installed together with or separately from the database server 230, in some embodiments, the dashboard 210 may be installed on the same database VM as the database server 230. In other embodiments, the dashboard 210 and the database server 230 may be installed on separate database VMs but operationally associated such that a user may access the database server via the dashboard.

Further, in some embodiments, the database server 230 may be associated with a repository 235. The repository 235 may include an administration database 240 that may be used to store information about the customer databases stored in the database storage system 215, information about the backups and clones of the customer databases, metadata about the database server 230, and any other information that the database server may need to properly administer the customer databases stored in the database storage system 215 and provide database management services. Thus, the customer databases stored in the database storage system 215 and the administration database 240 stored in the repository 235 are different databases configured to store different types of information. As discussed further below, the customer databases stored in the database storage system 215 and the administration database 240 may also be configured differently. Although a single instance of the administration database 240 is shown in the repository 235, in other embodiments, the repository may include multiple administration databases.

In some embodiments, the repository 235 (and, therefore, administration database 240) may be provisioned from the storage pool 170. In some embodiments, the repository 235 (and the administration database 240) may be part of a storage device that is same as or different from the database storage system 215. In some embodiments, the repository 235 (and the administration database 240) may be associated with the same database VM as the database server 230, while in other embodiments, the repository (and the administration database 240) and the database server may be associated with different database VMs on the same node, different database VMs on different nodes of the same cluster, or different database VMs on different clusters. In some embodiments, the repository 235 (and the administration database 240) may also be associated with one or more of the compute profile (e.g., amount of memory), network profile (e.g., where the repository and the administration database are stored), software profile (e.g., the database engine, such as Postgres), and database parameter profile (e.g., the database configuration). Similar to the database server 230, the various profiles for the repository 235 (and the administration database 240) may be default profiles, selected by the administrator from a list, or custom defined by the administrator.

Further, depending upon the location of the repository 235 (and the administration database 240) and the database server 230, the repository/administration database and the database server may have same or different profiles. For example, in some embodiments, if the repository 235 (and the administration database 240) and the database server 230 are located on the same database VM, the repository/administration database and the database server may have a common network profile. If the repository 235 (and the administration database 240) and the database server are located on different VMs or different nodes or different clusters, then they may have different network profiles. Similarly, there may be differences in the compute profile, software profile, and the database parameter profile of the database server 230 and the repository 235 (and the administration database 240).

Upon installing the database server 230 and the repository 235 (and the administration database 240), a user (e.g., the administrator or other user authorized to access the database system 200) may access the dashboard 210. The dashboard 210 may form the front end of the database system 200 and the database management system 205, including the database server 230 and the repository 235, and the database storage system 215 may form the backend of the database system. The database server 230 and/or the repository 235 (and the administration database 240) may be accessed via a computing device associated with the virtual computing system (e.g., of FIG. 1). In other embodiments, instead of or in addition to being accessible via a particular computing device, the database server 230 and/or the repository 235 (and the administration database 240) may be hosted on a cloud service and may be accessed via the cloud. In some embodiments, the database server 230 and/or the repository 235 (and the administration database 240) may additionally or alternatively be configured as a mobile application suitable for access from a mobile computing device (e.g., a mobile phone). In some embodiments, the database server 230 and/or the repository 235 (and the administration database 240) may be accessed via the dashboard 210, which in turn may be accessed via an Application Programming Interface ("API") 245. To access the database server 230 and/or the repository 235 (and the administration database 240), a user may access the dashboard 210 through the API 245. The user may use designated devices such as laptops, desktops, tablets, mobile devices, other handheld or portable devices, and/or other types of computing devices that are configured to access the API 245. These devices may be different from the computing device on which the database system 200 is installed.

In some embodiments and when the dashboard 210 is configured for access via the API 245, the user may access the dashboard via a web browser and upon entering a uniform resource locator ("URL") for the API such as the IP address of the database server 230 and/or the repository 235 (and the administration database 240) or other web address. Using the API 245 and the dashboard 210, the users may then send instructions to the database server 230 and receive information back from the database server. In some embodiments, the API 245 may be a representational state transfer ("REST") type of API. In other embodiments, the API 245 may be any other type of web or other type of API (e.g., ASP.NET) built using any of a variety of technologies, such as Java, .Net, etc., that is capable of accessing the database server 230 and facilitating communication between the users and the database server. In some embodiments, the API 245 may be configured to facilitate communication via a hypertext transfer protocol ("HTTP") or hypertext transfer protocol secure ("HTTPS") type request. The API 245 may receive an HTTP/HTTPS request and send an HTTP/HTTPS response back. In other embodiments, the API 245 may be configured to facilitate communication using other or additional types of communication protocols. In other embodiments, the database server 230 and/or the repository 235 (and the administration database 240) may be configured for access in other ways.

The dashboard 210 provides a user interface that facilitates human-computer interaction between the users and the database server 230. The dashboard 210 is configured to receive user inputs from the users via a graphical user interface ("GUI") and transmit those user inputs to the database server 230. The dashboard 210 is also configured to receive outputs/information from the database server 230 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the database server 230 to perform the functions described herein.

Thus, the dashboard 210 may receive a user request (e.g., an input) from the user and transmits that user request to the database server 230. In some embodiments, the user request may be to request a database management service. For example, in some embodiments, the user request may be to request a database provisioning service. In response to the user request for a database provisioning service, the database server 230 may activate the database provisioning system 220. In other embodiments, the user request sent via the dashboard 210 may be a database management service for making the database server 230 and/or the repository 235 (and the administration database 240) highly available. In response to receiving the request for making the database server 230 and/or the repository 235 (and the administration database 240) highly available, the database server may perform one or more operations to make the database server and/or the repository (and the administration database) highly available, as discussed in greater detail below. Generally speaking, all operations, including enabling/managing high availability, performed by the database server 230 are broadly referred to herein as a database management service or database management operation.

The database server 230 may be configured as, and/or operate in association with, hardware, software, firmware, or a combination thereof. Specifically, the database server 230 may include a processor 250 configured to execute instructions for implementing the database management services of the database server. In some embodiments, each of the database provisioning system 220 and the database protection system 225 may have their own separate instance of the processor 250. The processor 250 may be implemented in hardware, firmware, software, or any combination thereof. "Executing an instruction" means that the processor 250 performs the operations called for by that instruction. The processor 250 may retrieve a set of instructions from a memory for execution. For example, in some embodiments, the processor 250 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processor 250 may be configured to execute instructions without first copying those instructions to the RAM. The processor 250 may be a special purpose computer, and include logic circuits, hardware circuits, etc. to carry out the instructions. The processor 250 may include a single stand-alone processor, or a plurality of processors that use the same or different processing technology. The instructions may be written using one or more programming language, scripting language, assembly language, etc.

The database server 230 may also include a memory 255. The memory 255 may be provisioned from or be associated with the storage pool 170. In some embodiments, the memory 255 may be separate from the storage pool 170. The memory 255 may be any of a variety of volatile and/or non-volatile memories that may be considered suitable for use with the database server 230. In some embodiments, the memory 255 may be configured to store the instructions that are used by the processor 250. In some embodiments, the repository 235 may be part of the memory 255. Thus, although the memory 255 and the repository 235 are shown as separate elements, in some embodiments, the memory and the repository may be combined together into a single storage configured to provide storage for the database server 230. Further, although not shown, in some embodiments, the database provisioning system 220 and the database protection system 225 may each, additionally or alternatively, have their own dedicated memory.

Further, the database server 230 may be configured to handle a variety of types of database engine types. For example, in some embodiments, the database server 230 may be configured to manage PostgreSQL, Oracle, Microsoft SQL server, and MySQL database engine types. In other embodiments, the database server 230 may be configured to manage other or additional database engine types. Each database that is created within or registered with the database system 200 may be of a particular "database engine type." The database engine type may identify the type of database management system (e.g., Oracle, Postgr-eSQL, etc.) of a particular database. By virtue of creating or registering a database with a particular database engine type, that database is managed in accordance with the rules of that database engine type. Thus, the database server 230 is configured to be operable with and manage databases associated with a variety of database engine types.

It is to be understood that only some components of the database server 230 are shown and discussed herein. In other embodiments, the database server 230, and generally the database management system 205, may also include other components that are considered necessary or desirable in implementing the various database management services discussed herein.

Referring still to FIG. 2, the database storage system 215 is configured to store one or more customer databases that are either created within the database system 200 or registered with the database system. The database storage system 215 may include a source database storage 260 and a target database storage 265. The source database storage 260 is configured to store the original instances of the customer databases (also referred to herein as source customer databases) that are created within or registered with the database system 200 or restored using backups. The target database storage 265 is configured to store the clones of the source customer databases (also referred to herein as cloned customer databases). In some embodiments, the source database storage 260 and the target database storage 265 may be provisioned from the storage pool 170 and may include one or more virtual disk storage. For example, in some embodiments, the source database storage 260 may be associated with one or more database VMs (referred to herein as source customer database VMs) and the source customer databases stored within the source database storage may be stored within the virtual disks associated with the source customer database VMs. Similarly, in some embodiments, the target database storage 265 may be associated with one or more database VMs (referred to herein as target customer database VMs) and the customer databases stored within the target database storage may be stored within the virtual disks associated with the target customer database VMs. In some embodiments, each source customer database VM may be configured to store one or more source customer databases and each target customer database VM may be configured to store one or more target customer databases.

In other embodiments, the source database storage 260 and the target database storage 265 may additionally or alternatively be provisioned from other types of storage associated with the database system 200. For example, in some embodiments, either or both of the source database storage 260 and the target database storage 265 may be provisioned from the database storage device attached to the database server 230. In other embodiments, the source database storage 260 and/or the target database storage 265 may be separate from the database storage device attached to the database server 230. Further, in some embodiments, the source database storage 260 and the target database storage 265, and the repository 235 (and the administration database 240) may be provisioned from the same storage. In other embodiments, the source database storage 260 and the target database storage 265, and the repository 235 (and the administration database 240) may be provisioned from separate storage devices. Thus, the source database storage 260 and the target database storage 265, and the repository 235 (and the administration database 240) may be provisioned in a variety of ways.

As discussed above, the customer databases stored in the source database storage 260 and the target database storage 265 and the administration database 240 stored in the repository 235 may be configured differently. Specifically, the administration database 240 may not be used for storing customer data. Rather, the administration database 240 may be used to store information, as noted above, that may be needed to manage the customer databases, as well as the operation of the database system 200, and particularly the database server 230. Further, similar to the administration database 240, the customer databases may also have associated therewith one or more of the compute, network, software, and database parameter profiles. However, these profiles may be different for the customer databases and the administration database 240. For example, in some embodiments, default profiles may not be used for creating a customer database, while default profiles may be set for the administration database 240. In some embodiments, the values used in the profile may be different for a customer database and the administration database 240. For example, in some embodiments, the administration database 240 need not be a large database. Thus, in some embodiments, the administration database 240 may have a compute profile defining a memory of, for example, 4 GB. In comparison, in some embodiments, the customer database may have a larger compute profile (e.g., larger memory), such as 32 GB. Similarly, other differences may be present in the other profiles.

There may also be some similarities between a customer database and the administration database 240. For example, in some embodiments and as discussed above, a customer database may be protected by creating clones and backups. Similar clones and backups may be created for the administration database 240 as well. The database server 230 may be configured to manage and control both the customer databases and the administration database 240.

Further, although not shown, one or more of the source customer databases and/or one or more of the target customer databases may be made highly available. In other words, one or more of the source customer databases and/or one or more of the target customer databases may be replicated such that duplicate copies of those customer databases exist. By replicating/duplicating the one or more of the source customer databases and/or one or more of the target customer databases, if the virtual disk(s) associated with those databases becomes unavailable at one location, those databases may be accessed from another location. Similarly, in some embodiments, the administration database 240 may be made highly available. Making the administration database 240 highly available is discussed in greater detail below. In some embodiments, the database server 230 may also be made highly available to maintain a continuity of operation for the customer databases. Making the database server 230 highly available is also discussed in greater detail below.

Thus, in some embodiments, the database server 230 manages customer databases and maintains information about these customer databases in the administration database 240 stored in the repository 235. In some embodiments, a single instance of the database server 230 and a single instance of the administration database 240 may be used to manage the customer databases. While a single instance configuration is easier to maintain and install, as well as has a smaller resource footprint, it may have certain disadvantages. For example, in some cases (e.g., when a disaster condition occurs), the administration database 240 may become unavailable. In some embodiments, the administration database 240 may become unrecoverable. If the administration database 240 becomes unavailable or unrecoverable, data since the last backup of the administration database may be lost. In some embodiments, the administration database 240 may be backed up periodically (e.g., every hour). Thus, if the administration database 240 is being backed up every hour and a disaster condition causes the administration database to become unavailable or unrecoverable, data in the administration database created since the last hourly backup may be lost. In some cases, if the administration database 240 becomes unavailable or unrecoverable, the database server 230 may be unable to manage the customer databases and may, therefore, be unable to provide the database management services. Thus, if the administration database 240 becomes unavailable or unrecoverable, the database server 230 may also be deemed unavailable. If the database server 230 becomes unavailable, certain important tasks, such as backups, etc., for the existing customer databases may be missed. This may violate the RTO and RPO requirements of the SLA. The database server 230 may also be prevented from performing other types of databases management services, such as provisioning new databases, registering existing databases, etc. Thus, unavailability of the database server 230 may be undesirable.

Thus, the present disclosure provides a mechanism in which the administration database 240 may be made highly available. By making the administration database 240 highly available, the administration database may be made resilient against individual administration database failures. In some embodiments, the administration database 240 may be highly available by replicating the administration database (e.g., the data of the administration database) to multiple locations. An example of a highly available administration database is shown and described in FIG. 3.

Figure 3:
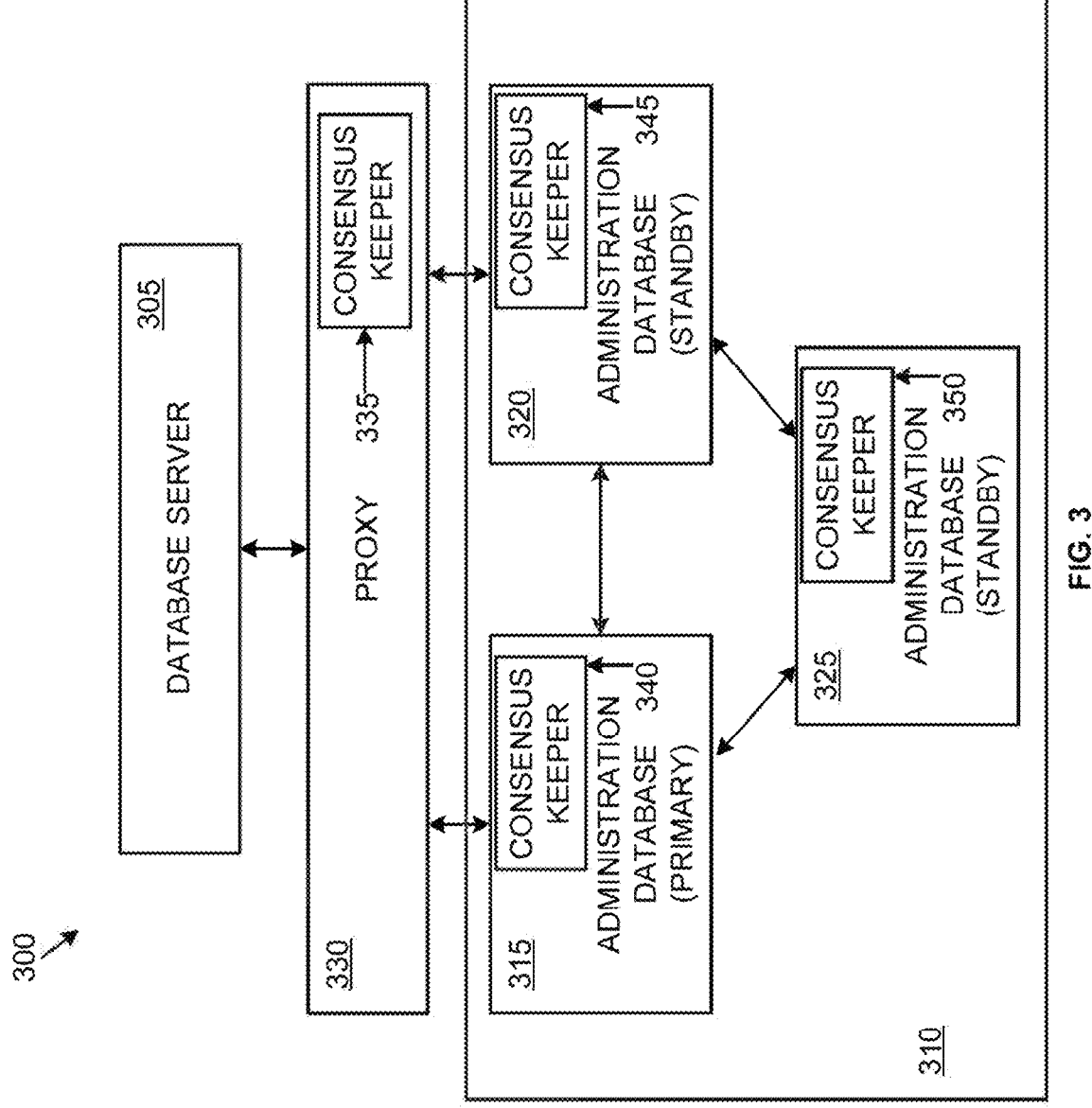
FIG. 3 is an example block diagram of a database management system of the database system of FIG. 2 having a highly available repository, in accordance with some embodiments of the present disclosure.

Turning now to FIG. 3, an example block diagram showing additional details of a database management system 300 is shown, in accordance with some embodiments of the present disclosure. The database management system 300 includes a database server 305 and a repository 310. The database server 305 has similar features as the database server 230, and is therefore, not described again. The repository 310 is analogous to the repository 235, and therefore, not described again. Thus, the database management system 300 may include may include two components: (1) the database server 305 which serves as an application server (e.g., Apache Tomcat), and (2) the repository 310 (e.g., the administration database) that stores the "state" information. In some embodiments, the repository 310 may be called the "data-tier" and the database server 305 may be called a "mid-tier."

Further, the repository 310 of the database management system 300 may be highly available. Specifically, the administration database stored in the repository 310 may be made highly available. To make the administration database highly available, in some embodiments, at least three instances of the administration database may be deployed. For example, a first instance 315, a second instance 320, and a third instance 325 of the administration database may be provided. In some embodiments, the first instance 315 of the administration database may be designated as a primary administration database, while the second instance 320 and the third instance 325 of the administration database may be designated as a secondary or standby administration database. When the primary administration database fails, one of the secondary administration databases may assume the role of the primary administration database to maintain continuity of operation. By virtue of having two secondary administration databases (e.g., the second instance 320 and the third instance 325) in the repository 310, if the second instance also fails, the database server 305 may continue operation with the third instance 325.

Further, in some embodiments, each of the first instance 315, the second instance 320, and the third instance 325 of the administration database and of the administration database may be located on separate nodes to provide broader protection against node failures. Thus, in some embodiments, each of the first instance 315, the second instance 320, and the third instance 325 of the administration database may be associated with separate database virtual machines. In some embodiments, each of the first instance 315, the second instance 320, and the third instance 325 may be located on separate virtual machines of the same node. By locating each of the first instance 315, the second instance 320, and the third instance 325 of the administration database on separate nodes (or at least separate database virtual machines), if one of the nodes (or database virtual machines) becomes unavailable or unrecoverable, the administration database may be accessed from the other node (or the other database virtual machine), thereby providing resiliency against one node (or one database virtual machine failures). In some embodiments, the nodes (or database virtual machines) on which the first instance 315, the second instance 320, and the third instance 325 of the administration database are located may be part of the same cluster. In other embodiments, the first instance 315, the second instance 320, and the third instance 325 may be part of separate clusters.

Although FIG. 3 shows an example in which the administration database has three copies (e.g., first instance 315, the second instance 320, and the third instance 325), in some embodiments, two copies or greater than three copies of the administration database may be provided to provide resiliency against greater than one node failures. The combination of the primary copy and the secondary copies may form a database cluster.

Further, regardless of the number of copies of the administration database, in some embodiments, one copy of the administration database may be designated as a primary and the remaining copies of the administration database may be designated as standby or secondary. For example, in FIG. 3, the first instance 315 of the administration database is shown designated as the primary and the second instance 320/the third instance 325 are shown designated as a standby. In some embodiments, write operations may be performed on the primary copy of the administration database. Thus, in some embodiments, write operations may be performed on the first instance 315 of the administration database while the first instance is designated as a primary. The data written to the primary may be replicated to the secondary. In some embodiments, since read operations do not modify data, read operations may be performed on either the primary or the secondary copies of the administration database to provide read balancing.

Replication of data from the primary copy of the administration database to each of the secondary copies of the administration database may occur in one of two ways: synchronous or asynchronous/streaming. In a synchronous replication, any changes made to the primary copy of the administration database may be instantaneously (or substantially instantaneously) made to at least one of the secondary copy of the administration database. A synchronous replication may impact performance, but may ensure that the at least one of the secondary copy is up-to-date. Since the administration database includes information about the customer databases (e.g., entity based and not metric based), retaining the data and modifying that data in the same order may be crucial. In some embodiments, such datasets may also not have a fast rate of queries, so a slightly lower performance may be acceptable. Thus, in some embodiments, asynchronous replication may be preferred.

In an asynchronous/streaming replication, the changes made to the primary copy of the administration database may be made to each of the secondary copy of the administration database periodically. The asynchronous replication may avoid negatively impacting performance. However, if the primary copy of the administration database crashes before changes made to the primary copy are transferred over to the secondary copies, such changes may be lost. Thus, the amount of data loss may be proportional to the replication delay at the time of failover (e.g., when the primary crashes and one of the secondary assumes the role of the primary). In some embodiments, if a synchronous replication is used, and if the synchronous replication becomes a bottleneck, the replication mechanism may be switched over to asynchronous.

In some embodiments, one of the secondary administration databases (e.g., the second instance 320 or the third instance 325) may be designated for synchronous replication and the remaining ones of the secondary administration databases may be designated for asynchronous replication. For example, in some embodiments, if the first instance 315 of the administration database is the primary, the second instance 320 of the administration database may be designated for synchronous replication and the third instance 325 of the administration database may be designated for asynchronous replication. When the first instance 315 fails, the second instance 320 may assume the role of the primary and the third instance 325 may switch to a synchronous replication.

Thus, in some embodiments, write operations may be performed on the primary administration database (e.g., the first instance 315) and if the primary administration database fails (e.g., becomes unavailable or unrecoverable), one of the secondary administration databases (e.g., the second instance 320 or the third instance 325) may automatically assume the role of the primary administration database. In some embodiments, to enable scalability of the administration database, the database server 305 may be isolated from the repository 310 (and therefore the first instance 315, the second instance 320, and the third instance 325 of the administration database). By isolating the database server 305 from the repository 310, the number of copies of the administration database being maintained may be changed without needing to change the configuration of the database server. Further, in some embodiments, by isolating the database server 305 from the repository 310, the database server or the repository may fail without impacting the other.

In some embodiments, the database server 305 may be isolated from the repository 310 by installing the database server 305 on a separate node (or database virtual machine) than the first instance 315, the second instance 320, and the third instance 325 of the administration database. Thus, in some embodiments, each of the database server 305, the first instance 315, the second instance 320, and the third instance 325 of the administration database may be on separate nodes (or database virtual machines). In some embodiments, the separate nodes (or database virtual machines) may be part of the same cluster, while in other embodiments, one or more of the separate nodes (or database virtual machines) may be part of different clusters. Further, to isolate the database server 305 from the repository 310, in some embodiments, a proxy 330 may be used to facilitate communication between the database server and the administration databases in the repository 310. In some embodiments, the proxy 330 may also be on a separate node (or database virtual machine) than the database server 305, the first instance 315, the second instance 320, and/or the third instance 325 of the administration database. Further, the separate node (or database virtual machine) may be part of the same cluster or different clusters.

The proxy 330 may be configured to hide the complexity and scalability of the repository 310 from the database server 305. In some embodiments, the proxy 330 may be configured to communicate with the primary copy of the administration database. Thus, while the first instance 315 of the administration database is the primary, the proxy 330 may communicate with the first instance. When the second instance 320 of the administration database assumes the role of the primary, the proxy 330 may switch to communicating with the second instance. In some embodiments, the proxy 330 may monitor all instances of the administration database within the repository 310 for state transitions to identify the primary copy and the secondary copy(ies) of the administration database. Based upon the state transitions, the proxy 330 may determine which copy of the administration database is the primary and forward all requests from the database server 305 to the primary. Thus, regardless of the configuration of the repository 310, the database server 305 communicates with the proxy 330, and the proxy communicates with the repository 310, and particularly, with the primary administration database. The primary administration database is also referred to herein as the leader.

In some embodiments, the proxy 330 may rely on consensus keeper 335 to identify the state transitions within the repository 310 and determine the leader of the repository. In some embodiments, the consensus keeper 335 may communicate with consensus keepers 340, 345, and 350 associated with the first instance 315, the second instance 320, and the third instance 325, respectively, of the administration database. In some embodiments, the consensus keeper 335 may be installed on the same node (or database virtual machine) as the proxy 330. Similarly, in some embodiments, the consensus keepers 340, 345, and 350 may be installed on the same nodes (or database virtual machines) as the first instance 315, the second instance 320, and the third instance 325, respectively. In some embodiments, one or more of the consensus keepers 335-350 may be installed on different nodes (or database virtual machines) of the same cluster or different clusters. The consensus keepers 335-350 may collectively form a consensus cluster. When a new instance of the administration database is created, that instance may register with its local consensus keeper (e.g., the consensus keeper that is on the same node or is associated with the node on which the administration database is created). For example, when the first instance 315 is created, the first instance of the administration database may register with the consensus keeper 340.

The consensus keepers 340-350 may each maintain the states of all of the instances of the administration databases. Thus, each of the consensus keepers 340-350 may be aware of the state transitions of each of the first instance 315, the second instance 320, and the third instance 325 of the administration database. Each of the consensus keepers 340-3350 may also know which instance of the administration database is the leader. The consensus keeper 335 may communicate with the consensus keepers 340, 345, and/or 350 to identify the leader and send requests to the leader.

In some embodiments, each of the consensus keepers 335-350 may be "etcd" type consensus keepers. Etcd is a distributed key-value store configured to provide atomic key updates across the entire etcd cluster (e.g., the consensus keeper cluster). A consensus operation may be used to elect a leader, to ensure that there is only a single leader at any given time, detect state transitions for both the leader and the secondary instances of the administration database, and resolve common distributed system problems such as split brain and network split. Selecting a leader using consensus is discussed in greater detail below. In other embodiments, other types of consensus keepers may be used.

Further, in some embodiments, the state transitions between the various instances of the administration database may be facilitated by an agent. Thus, although an agent is not shown in the first instance 315, the second instance 320, and the third instance 325, each of those instances of the administration database may be associated with a respective agent that may be configured to handle state transitions and inform the underlying consensus keeper of the various state transitions. For example, in some embodiments, the agent may implement a state machine to handle the state transitions across all of the instances/nodes of the database cluster. In some embodiments, a Patroni agent may be used for handling the state transitions. In other embodiments, other types of agents may be used.

Thus, by providing multiple copies of the administration database, the database management system 300 provides a highly available administration database. When the primary administration database (e.g., the first instance 315) fails, the secondary administration database (e.g., the second instance 320 or the third instance 325) assumes the role of the primary, thereby ensuring continuity of operation and preventing the database server 305 from becoming unavailable due to failure in the repository 310. However, in some embodiments, if a single secondary node In such instances, in some embodiments, the database management system 300 may continue operation as a non-high available system or the database management system may operate in a degraded mode until the failed primary recovers and is designated as a secondary. In some embodiments, instead of the primary (e.g., the first instance 315) failing, the secondary (e.g., the second instance 320) may fail.

As discussed above, when changes are made to the data in the primary administration database (e.g., the first instance 315), those changes are replicated to the secondary administration database (e.g., the second instance 320 and the third instance 325). However, if both secondary administration database instances fail, the primary administration database is unable to replicate the changes to the secondary administration database instances. In such cases, in some embodiments, the database server 305 may prevent any changes to be made to the primary administration database until a secondary administration database becomes available. Without being able to make any changes to the primary administration database, the primary administration database may effectively be deemed unavailable. With the primary administration database being effectively unavailable and the secondary administration database being unavailable/unrecoverable, the database server 305 may be considered unavailable, violating the RPO and RTO in the SLA.

To avoid the failure/unavailability of the secondary administration database impacting the continuity of operation, in some embodiments, additional secondary instances of the administration database may be used. In some embodiments, as long as one secondary instance of the administration database remains available, the primary instance of the administration database may continue operations normally (normal mode). When no secondary administration database is available in the database cluster causing the primary administration database to become unavailable as well, to prevent the database server 305 from becoming unavailable, in some embodiments, the database server and the primary administration database may operate in a degraded mode. Since the primary administration database is operationally sound and is simply unavailable due to the secondary administration database being unavailable, in some embodiments, read operations may continue to be performed on the primary administration database in the degraded mode, thereby preventing the database server 305 from becoming unavailable. Thus, in the degraded mode, read operations may be performed and write operations may be prevented.

Thus, the database management system 300 may also operate in a normal mode or a degraded mode. In the normal mode, at least one secondary administration database may be available. When both secondary administration databases (e.g., the second instance 320 and the third instance 325) become unavailable, then the database management system 300 may operate in a non-highly available mode (e.g., no backups available) or a degraded mode, as discussed above.

Figure 4:
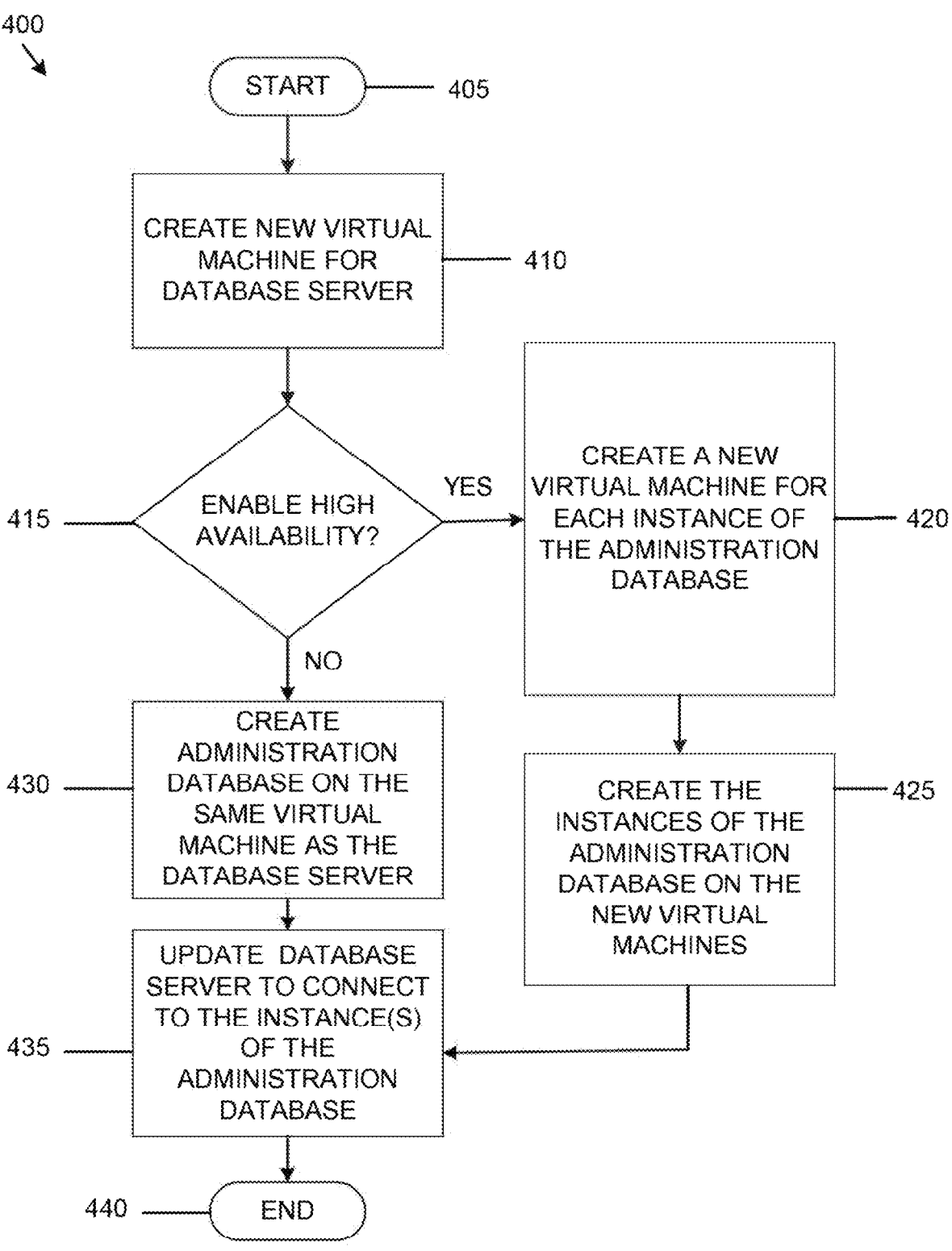
FIG. 4 is an example flowchart outlining operations for providing a highly available repository in the database management systems of FIG. 3, in accordance with some embodiments of the present disclosure.

Referring to FIG. 4, an example flowchart outlining operations of a process 400 is shown, in accordance with some embodiments of the present disclosure. The process 400 may include other or additional operations depending upon the particular embodiment. The process 400 may be performed by a controller (e.g., the processor 250) that is configured to enable high availability in the repository. The process 400 may be used to set up a highly available repository at the time of installing the database server. Thus, upon starting at operation 405, the controller creates a new database server virtual machine for the database server and installs the database server as discussed above. At operation 415, the controller determines if the user desires high availability for the repository (e.g., the administration databases). If high availability is desired for the repository, the process 400 proceeds to operation 520 where the controller creates at least one new virtual machine for each instance of the administration database. In some embodiments, at least one instance of the administration database may be on the same cluster as the database server and any remaining instances of the administration database may be on a separate cluster. In other embodiments, each instance of the administration database may be on a separate cluster than the cluster of the database server. Further, in some embodiments in which the database server and at least one instance of the administration database are on the same cluster, each of the at least one instance of the administration database and the database server may be on different virtual machines of the same node or on difference nodes.

Upon creating the new virtual machine for each instance of the administration database that is desired, at operation 425, an instance of the administration database is created on the newly created virtual machine(s). Thus, after the operation 425, the database management system may have multiple instances of the administration database, as shown above in FIG. 3. On the other hand, if at the operation 415, the controller determines that high availability is not desired for the repository, the process 400 proceeds to operation 430 where an instance of the administration database is created on the same virtual machine as the database server. At operation 435, all of the instances of the administration database are associated with the database server created at the operation 410 and the process 400 ends at operation 440. Specifically, the configuration of the database server may be updated to allow connection to each instance of the administration database.

In some embodiments, a proxy (e.g., the proxy 330) may be established between the database server and the instances of the administration database. In such cases, when the database server is installed, the configuration of the database server may be updated to allow the database server to connect to the proxy at the operation 435. Further, when the instances of the administration databases are created, the configuration of the proxy may be updated (e.g., at the operation 435) to allow the proxy to connect to each instance of the administration database. Thus, by associating the database server with the proxy and associating the proxy with the administration database instances, the database server may be set up for communicating with the administration database.

Turning now to FIG. 5, an example flowchart outlining operations of a process 500 is shown, in accordance with some embodiments of the present disclosure. The process 500 may include other or additional operations depending upon the particular embodiment. The process 500 may be performed by a controller (e.g., the processor 250) that is configured to enable high availability in the repository. The process 500 may be used to set up a highly available repository after the setup of the database server. Thus, at the start of the process 500, a single instance of the database server and a single instance of the administration database on the same virtual machine (or cluster) as the database server already exists. The single instance of the administration database may be referred to as the original instance. The process 500 starts at operation 505 when a user desires to set the repository as a highly available repository.

The process 500 is explained with respect to FIG. 3 for creating a 3 cluster highly available repository. However, the process 500 may be used to create a highly available repository in any number of clusters. For creating a 3 cluster highly available repository, at operation 510, the controller creates a 3 node database cluster. In some embodiments, each of the 3 nodes may be on a different cluster (e.g., different from the cluster on which the database server resides). In some embodiments, at least one of the 3 nodes may be on the same cluster as the database server. In the embodiments in which at least one of the 3 nodes is on the same cluster as the database server, each of those nodes may be separate from the node on which the database server is located. In some embodiments, at least one of the 3 nodes may be on the same node as the database server, but may be on different virtual machines.

At operation 515, operations on the original instance of the administration database are stopped and the database server is turned off. Upon stopping operations on the administration database, a backup of the administration database is created at operation 520. The backup of the administration database is copied to each of the 3 nodes created at the operation 510 to create additional instances of the administration database. At operation 530, the configuration of the database server is modified to include all of the new instances of the administration database and then the database server is restarted at operation 535. In some embodiments, a proxy (e.g., the proxy 330) may be established between the database server and the instances of the administration database, as discussed above in FIG. 4. At operation 540, normal operations are resumed on the database server and the administration database. In some embodiments, as part of the operations 525 or 530, a primary instance of the administration database may be selected. The process 500 ends at operation 545.

Figure 6:
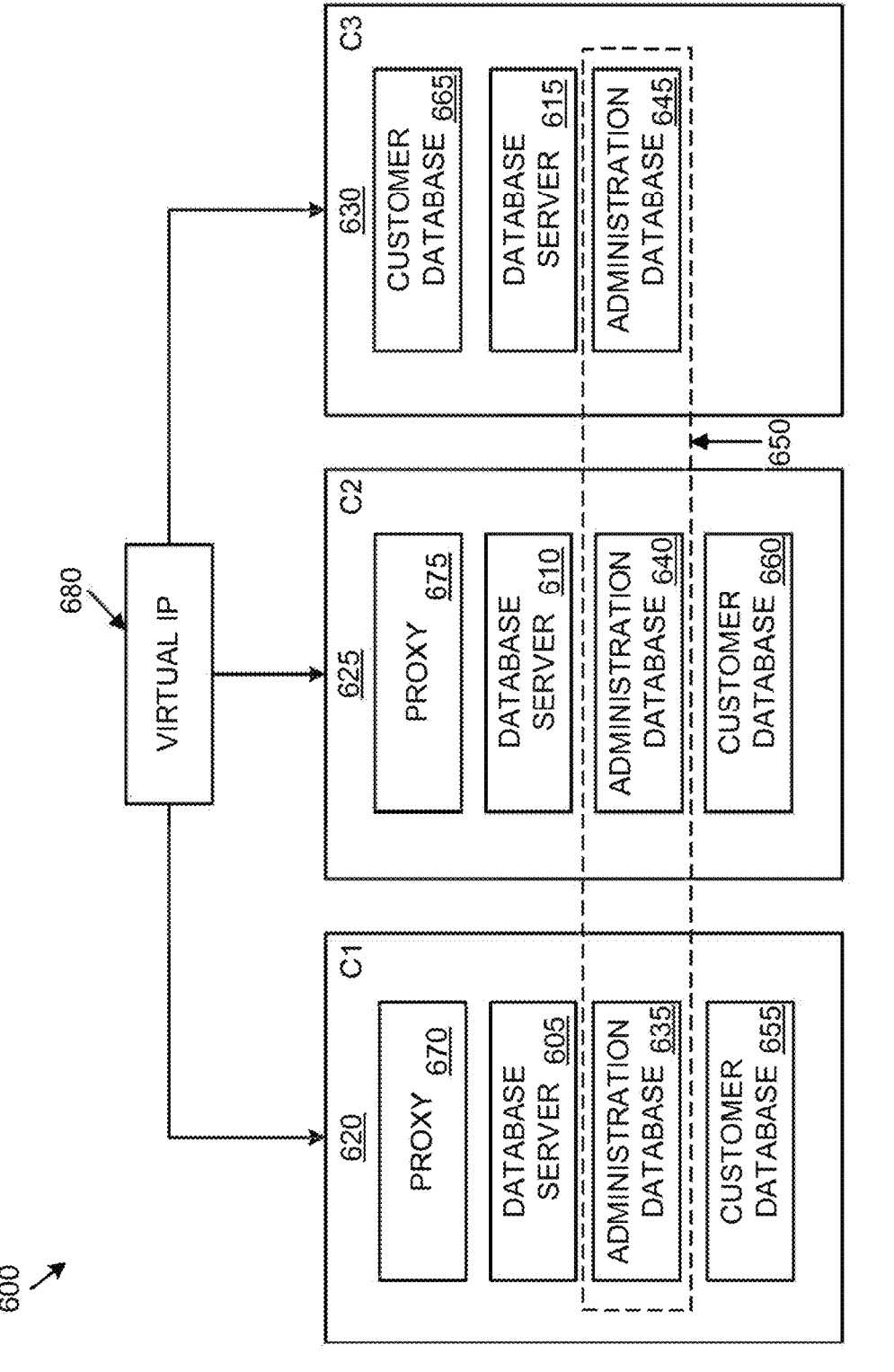
FIG. 6 is an example block diagram of a database management system of the database system of FIG. 2 having a highly available repository and a highly available database server, in accordance with some embodiments of the present disclosure.
Figure 7:
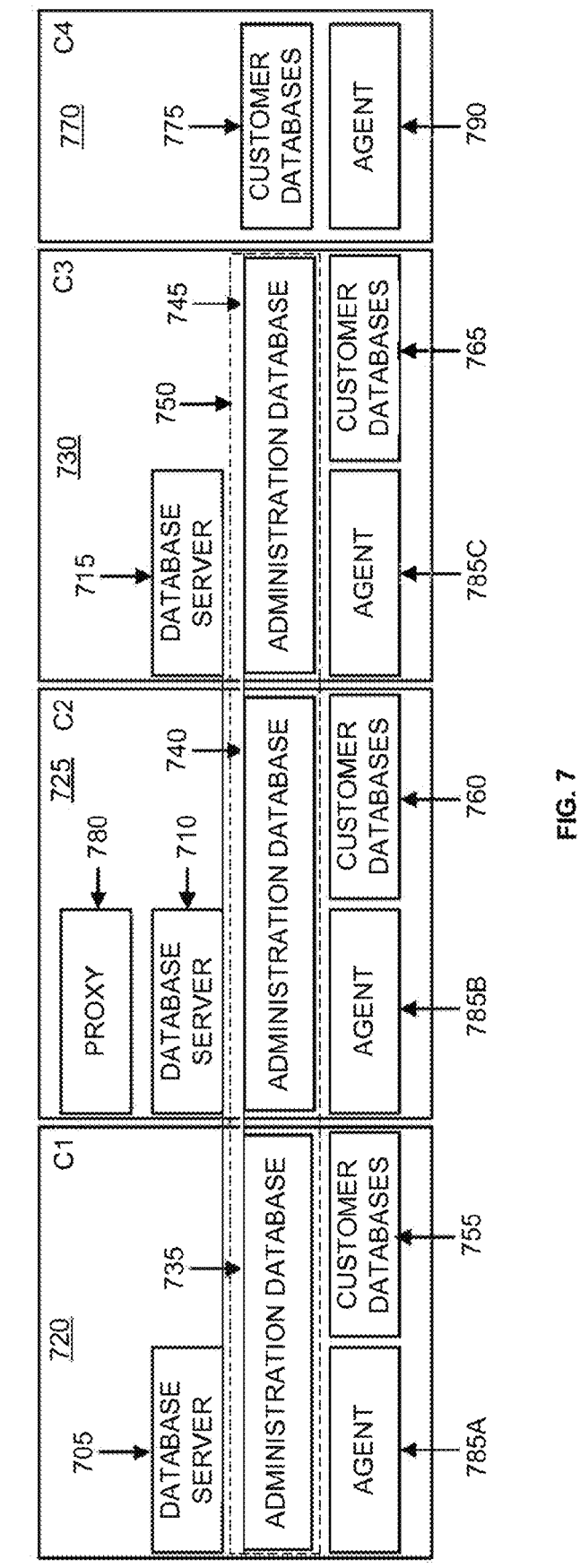
FIG. 7 is another example block diagram of a database management system of the database system of FIG. 2 having a highly available repository and a highly available database server, in accordance with some embodiments of the present disclosure.
Figure 8:
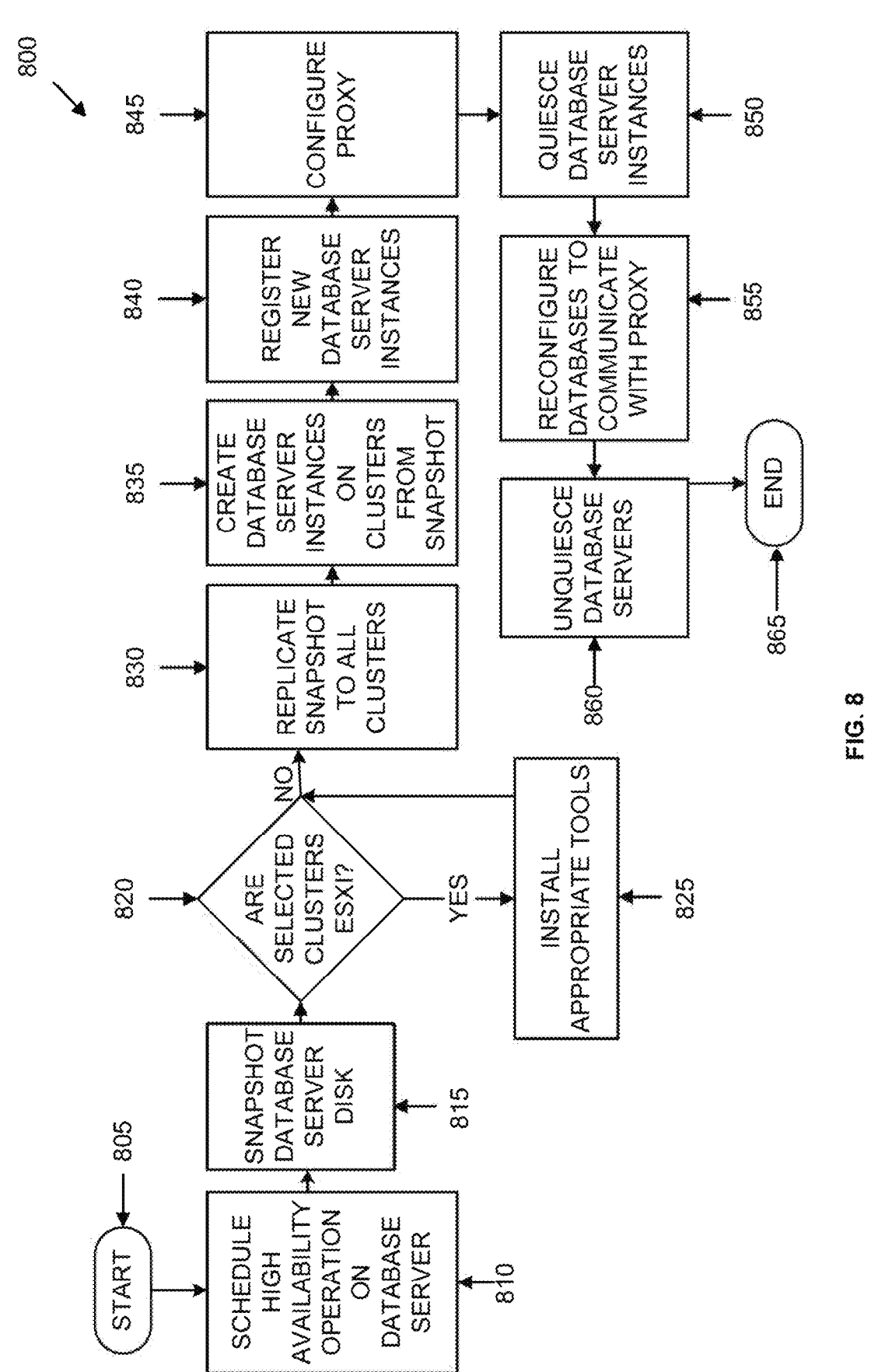
FIG. 8 is an example flowchart outlining operations for setting up a highly available database server of FIGS. 6 and 7, in accordance with some embodiments of the present disclosure.

In some embodiments and as discussed above, the database server 305 may become unavailable even if the administration database is highly available. Thus, in some embodiments, the database server 305 may also be made highly available. In some embodiments, the database server 305 may be made highly available by providing at least two instances of the database server. FIGS. 6-8 describe examples having a highly available database server and a highly available administration database. Thus, referring to FIG. 6, an example block diagram showing additional details of a database management system 600 is shown, in accordance with some embodiments of the present disclosure. The database management system 600 is analogous to the database management system 205, and has similar components as the database management system 205. The database management system 600 includes a highly available database server and a highly available repository. For example, the database management system 600 includes a first instance 605 of a database server, a second instance 610 of the database server, and a third instance 615 of the database server. The first instance 605 may be located on a first cluster 620, the second instance 610 may be located on a second cluster 625, and the third instance 615 may be located on a third cluster 630. Thus, each of the first instance 605, the second instance 610, and the third instance 615 of the database server may be located on separate clusters. In some embodiments, the first cluster 620, the second cluster 625, and the third cluster 630 may each be part of one availability zone, while in other embodiments, one or more of those clusters may be part of separate availability zones.

In some embodiments, one of the first instance 605, the second instance 610, and the third instance 615 may be designated as the primary database server and the remaining instances of the database server may be designated as secondary database servers. If the primary database server fails (or if the node or cluster on which the primary database server is located fails), one of the secondary database servers may assume the responsibilities of the primary database server. Although three instances of the database server are shown in the database management system 600, in other embodiments, two instances or greater than three instances, with each instance being located on a different cluster may be used.

Although the first instance 605, the second instance 610, and the third instance 615 of the database server are shown as being on separate clusters, in some embodiments, one or more of those instances may be on different nodes of the same cluster and/or on different virtual machines of the same node. In some embodiments, the resiliency of the database server may be improved by providing the first instance 605, the second instance 610, and the third instance 615 on separate clusters, such that if a particular node or an entire cluster goes down, the database server may continue operating from another cluster.

The first instance 605, the second instance 610, and the third instance 615 of the database server each have similar features as the database server 230, and are therefore, not described again. Further, although only three clusters are shown in the database management system 600, in other embodiments, the database management system may have two clusters, with each cluster having an instance of the database server, or more than three clusters, with each cluster having an instance of the database server. The primary database server (e.g., the first instance 605) is also referred to herein as a leader database server. The leader may be elected through a consensus operation, which is described in greater detail below. By virtue of providing multiple instances of the database server (e.g., the first instance 605, the second instance 610, and the third instance 615) and locating each of those instances on separate clusters, the database servers are made resilient to failures and considered highly available.

In addition to the highly available database servers, in some embodiments, the repository may also be made highly available, as discussed above in FIG. 3. For example, each of the clusters 620-630 may have an instance of an administration database thereon. For example, the first cluster 620 may have a first instance 635 of an administration database, the second cluster 625 may have a second instance 640 of the administration database, and the third cluster 630 may have a third instance 645 of the administration database. Although the first instance 635, the second instance 640, and the third instance 645 of the administration database are located on the same cluster as the first instance 605, the second instance 610, and the third instance 615 of the database server, respectively, in other embodiments, one or more of the instances of the database server and administration database may be located on separate clusters. For example, in some embodiments, the first instance 605 of the database server and the first instance 635 of the administration database may be located on separate clusters, and so on. When located on the same cluster, in some embodiments, the instance of the database server (e.g., the first instance 605) and the instance of the administration database (e.g., the first instance 635) may be located on the same node or separate nodes of the cluster. The first instance 635, the second instance 640, and the third instance 645 of the administration database together are part of a repository 650. The repository 650 is analogous to the repository 235, and therefore, not described again. The repository 650 is configured for high availability operations, as discussed above in FIGS. 3-5.

As indicated above, the administration database is a separate database from a customer database. The customer database may be used for storing user data. Thus, the database management system 600 may have one or more customer databases. For example, the database management system 600 shows customer databases 655, 660, 665 located on the first cluster 620, the second cluster 625, and the third cluster 630, respectively. Although the customer databases 655-665 are shown as located on the same clusters as the first instance 605, the second instance 610, and the third instance 615 of the database server and the first instance 635, the second instance 640, and the third instance 645 of the administration database, in other embodiments, one or more of the customer databases may be located on clusters separate from the database server and/or the administration database. Further, in some embodiments, one or more of the customer databases 655-665 may also be highly available and configured to be managed by the database management system 600.

By virtue of making the database server highly available (e.g., by providing multiple instances of the database server on separate clusters) and by making the repository highly available (e.g., by providing multiple instances of the administration database on separate clusters), the database management system 600 may be considered highly available. When the primary instance of the administration databases goes down, a secondary instance of the administration database may assume the responsibility of the primary administration database, as discussed above in FIG. 3, and when the primary database server goes down, a secondary database server assumes the responsibility of the primary database server.

Further and as discussed above in relation to FIG. 3, the database server may communicate with the administration database via a proxy (e.g., API gateway, HA proxy) when the administration database is highly available. Similarly, in FIG. 6, the primary database server (e.g., the first instance 605) may be configured to communicate with the first instance 635, the second instance 640, and the third instance 645 of the administration database via a proxy 670 or 675. Each of the proxy 670 or 675 may be considered analogous to the proxy 330, and is therefore not described again. In some embodiments, one of the proxy 670 or 675 may be designated as a primary proxy. The other one of the proxy 670 or 675 may be designated as a secondary proxy. The primary database server (e.g., the first instance 605) may communicate with the primary proxy. If the primary proxy goes down, the primary database server may start communicating with the secondary proxy. Although no proxy is shown on the third cluster 630, in some embodiments, a proxy may be provided on that cluster too. By providing a redundant copy of the proxy (e.g., the proxy 670, 675), a single point of failure in the proxy may be avoided. Further, although the proxy 670 and 675 are located on a cluster (e.g., the first cluster 620, the second cluster 625) on which an instance of the database server (e.g., the first instance 605, the second instance 610) and/or an instance of the administration database (e.g., the first instance 635, the second instance 640) is located, in some embodiments, the proxy may be located on a cluster not having an instance of the database server and/or an instance of the administration database. When located on the same cluster as an instance of the database server and/or an instance of the administration database, the proxy may be located on different nodes than the database server and/or the administration database, or on different virtual machines of the same node.

In some embodiments, the redundant proxy (e.g., the proxy 670, 675) may also be used for load balancing. For example, in some embodiments, the proxy 670, 675 may implement various load balancing schemes such as round-robin, weighted, priority based, etc. In some embodiments, the proxy 670, 675 may be configured to perform health checks on the database server instances (e.g., the first instance 605, the second instance 610, and the third instance 615), and remove (e.g., disable) the database server instances that fail the health check. In some embodiments, the proxy 670, 675 may be configured to expose a single "ip:port" address to communicate with the user. The single address may then fan out to multiple proxy addresses at the back end. For example, in an e-commerce application where different micro services (e.g., cart, payment, advertisements, search, etc.) make up an application, each micro service may be associated with a proxy. However, one of the proxies may be designated for communication with the user. The proxy 670, 675 may thus be configured to receive user requests and forward those requests to the primary database server. The proxy 670, 675 may also receive requests from the primary database server and communicate with the primary administration database.

In some embodiments, the proxy 670, 675 may communicate with the various clusters via a virtual IP 680. In some embodiments, the virtual IP 680 may be an IP (Internet protocol) address that may be configured within each of the proxy 670, 675 to establish communication with the clusters 620-630. In some embodiments, a user may use the virtual IP 680 to communicate with the database management system 600. In some embodiments, the proxy 670, 675, and the virtual IP 680 may be part of the same network/VLAN (Virtual Local Area Network). Further, in some embodiments, although not shown, each of the clusters 620-630 may have an agent, as discussed above in FIG. 3, to monitor and maintain the state transitions of the administration databases (e.g., the first instance 635, the second instance 640, and the third instance 645 of the administration database). The agents may communicate with the proxy 670 and/or 675 to apprise the proxy of the current status of the administration databases (e.g., which administration database is the primary, etc.). In some embodiments, the agents may be configured to communicate with the primary proxy only. In other embodiments, the agents may be configured to communicate with the primary and the secondary proxy.

Further, in some embodiments, the elements (e.g., the proxy, database server, customer database, and/or administration database) that are located on the same cluster may be located on the same node of the cluster or one or more of those elements may be located on different nodes of the cluster. In other embodiments, one or more of those elements may be located on separate clusters. Additionally, although not shown, each of the clusters 620-630 may be associated with a consensus keeper, as discussed in FIG. 3 above.

In some embodiments, instead of providing redundancy in the proxy, a single proxy may be used, as shown in FIG. 7. Thus, referring to FIG. 7, an example block diagram showing additional details of a database management system 700 is shown, in accordance with some embodiments of the present disclosure. The database management system 700 is similar to the database management system 600. Thus, the database management system 700 has a highly available database server and a highly available repository. For example and similar to the database management system 600, the database management system 700 may include a first instance 705 of a database server, a second instance 710 of the database server, and a third instance 715 of the database server. The first instance 705 may be located on a first cluster 720, the second instance 710 may be located on a second cluster 725, and the third instance 715 may be located on a third cluster 730. Thus, each of the first instance 705, the second instance 710, and the third instance 715 of the database server may be located on separate clusters. In some embodiments, the first cluster 720, the second cluster 725, and the third cluster 730 may each be part of one availability zone, while in other embodiments, one or more of those clusters may be part of separate availability zones.

In some embodiments, one of the first instance 705, the second instance 710, and the third instance 715 may be designated as the primary database server and the remaining instances of the database server may be designated as secondary database servers. If the primary database server fails (or if the cluster on which the primary database server is located fails), one of the secondary database servers may assume the responsibilities of the primary database server. Although three instances of the database server are shown in the database management system 700, in other embodiments, two instances or greater than three instance, with each instance being located on a different cluster may be used. The first instance 705, the second instance 710, and the third instance 715 of the database server each have similar features as the database server 230, and are therefore, not described again. The primary database server (e.g., the first instance 705) is also referred to herein as a leader database server.

In addition to the highly available database servers, each of the first cluster 720, the second cluster 725, and the third cluster 730 may have an instance of an administration database thereon. For example, the first cluster 720 may have a first instance 735 of an administration database, the second cluster 725 may have a second instance 740 of the administration database, and the third cluster 730 may have a third instance 745 of the administration database. Although the first instance 735, the second instance 740, and the third instance 745 of the administration database are located on the same cluster as the first instance 705, the second instance 710, and the third instance 715 of the database server, respectively, in other embodiments, one or more of the instances of the database server and administration database may be located on separate clusters. For example, in some embodiments, the first instance 705 of the database server and the first instance 735 of the administration database may be located on separate clusters, and so on. When located on the same cluster, in some embodiments, the instance of the database server (e.g., the first instance 705) and the instance of the administration database (e.g., the first instance 735) may be located on the same node or separate nodes of the cluster. The first instance 735, the second instance 740, and the third instance 745 of the administration database together are part of a repository 750. The repository 750 is analogous to the repository 235, and therefore, not described again. The repository 750 is configured for high availability operations, as discussed above in FIGS. 3-5.

Further, the database management system 700 may be configured to manage customer databases. For example, the database management system 700 may be configured to manage customer databases 755, 760, 765 located on the first cluster 720, the second cluster 725, and the third cluster 730, respectively. Although the customer databases 755-765 are shown as located on the same clusters as the first instance 705, the second instance 710, and the third instance 715 of the database server and the first instance 735, the second instance 740, and the third instance 745 of the administration database, in other embodiments, one or more of the customer databases may be located on clusters separate from the database server and/or the administration database. For example, the database management system 700 shows a cluster 770 having a customer database 775. The cluster 770 does not have a database server instance or an administration database instance located thereon. Regardless, the database management system 700, and particularly, the primary database server may be configured to manage the customer database 775.

Further the primary database server may communicate with the primary administration database via a proxy (e.g., API gateway, HA proxy) when the administration database is highly available. For example, the primary database server (e.g., the first instance 705) may be configured to communicate with the first instance 735, the second instance 740, and the third instance 745 of the administration database via a proxy 780. The proxy 780 may be considered analogous to the proxy 330, and is therefore not described again. As discussed above, the primary database server (e.g., the first instance 705) may communicate with the proxy 780, and the proxy may communicate with the repository 750. Although the proxy 780 is located on a cluster (e.g., the second cluster 725) on which an instance of the database server (e.g., the second instance 710) and/or an instance of the administration database (e.g., the second instance 740) is located, in some embodiments, the proxy may be located on the cluster 770 or an entirely different cluster. The proxy 780 may thus be configured to receive user requests and forward those requests to the primary database server. The proxy 780 may also receive requests from the primary database server and communicate with the primary administration database.

In contrast to FIG. 6 in which two instances of the proxy are provided, the embodiment of FIG. 7 includes a single instance of the proxy. While the redundancy provided by the duplicate proxy in FIG. 6 is lost in FIG. 7, beneficially a user may not be required to share networks across clusters, thereby saving cluster resources and expanding the clusters that may be selected for the highly available operations.

Further, in some embodiments, each of the first cluster 720, the second cluster 725, and the third cluster 730 may have an agent (e.g., agents 785A-785C) to monitor and maintain the state transitions of the administration databases (e.g., the first instance 735, the second instance 740, and the third instance 745 of the administration database). The agents 785A-785C may communicate with the proxy 780 to apprise the proxy of the current status of the administration databases (e.g., which administration database is the primary, etc.). In some embodiments, the cluster 770 may also have an agent 790. The agent 790 may be used by the primary database server to manage the customer database 775. Similarly, in some embodiments, the agents 785A-785C (as well as the agents discussed above with respect to FIGS. 3-6) may also be used to manage the customer databases located on the associated clusters. In some embodiments, the agents used for managing customer databases may be different than the agents used for managing administration databases. The customer databases may also be highly available.

Further, in some embodiments, the elements (e.g., the proxy, database server, customer database, and/or administration database) that are located on the same cluster may be located on the same node of the cluster or one or more of those elements may be located on different nodes of the cluster. In other embodiments, one or more of those elements may be located on separate clusters. Further, in some embodiments, one or more instances of the database server and/or the administration database that are on separate clusters may instead be on different virtual machines of the same node of the same cluster, or on different nodes of the same cluster. Additionally, although not shown, each of the first cluster 720, the second cluster 725, and the third cluster 730 may be associated with a consensus keeper, as discussed in FIG. 3 above.

Turning now to FIG. 8, an example flowchart outlining operations of a process 800 is shown, in accordance with some embodiments of the present disclosure. The process 800 may include other or additional operations depending upon the particular embodiment. The process 800 may be performed by a controller (e.g., processor 250) configured to enable high availability in the database server. The process 800 starts at operation 805 with receiving a user request to enable high availability in the database server. For purposes of explanation only, the process 800 is explained with respect to FIG. 7. However, the process 800 may be applicable to FIG. 6 also.

Upon receiving the user request to enable high availability in the database server, at operation 810, details for creating a high availability cluster for the database server are obtained from the user. For example, at the operation 810, the user may be requested to provide cluster details (e.g., number of clusters, identity of clusters, network information of those clusters, etc.) where the multiple instances of the database server are to reside. In some embodiments, before the operation 810, if the database management system 700 is not set up for high availability administration databases (repository high availability), the user may be required to set up high availability for the administration databases using the processes 400 or 500. Upon enabling high availability for the administration databases, in some embodiments, the user may also be required to enable high availability for the database server before setting up the database server for high availability.

In some embodiments, before enabling database server high availability, the database server may be operating in a non-highly available mode. In the non-highly available mode, an original single instance of the database server may be present (e.g., similar to the embodiments of FIG. 3). As an example, say the original single instance of the database server (e.g., the first instance 705) existed on the first cluster 720 before the high availability setup of the database server. To set up that single instance of the database server to be highly available (e.g., as in the embodiments of FIGS. 6 and 7), at the operation 810, the user may request creating additional instances of the database server (e.g., the second instance 710 and the third instance 715) on the second cluster 725 and the third cluster 730, respectively. Before converting the single instance of the database server into a high available database server, the database server high availability option may need to be enabled. In some embodiments, enabling database server high availability may include creating at least two new database virtual machines. In some embodiments, these new database virtual machines may be on separate clusters to enable a multi-cluster high availability. In some embodiments, various compute resources (e.g., vCPU and memory) may be associated with each of the new database virtual machines.

Upon setting up the administration database high availability using the process 400 or 500 and enabling a database server high availability, the process 800 may be used to set up the database server high availability. In addition to receiving the cluster details at the operation 810, the controller may receive any other details that may be needed to set up database server high availability. At operation 815, the current single instance of the database server may be cloned (e.g., a snapshot of the virtual disk(s) associated with the database server may be taken). For example, the virtual disk(s) associated with the original single instance (e.g., the first instance 705) of the database server may be snapshotted at the operation 815.

Additionally, at operation 820, the controller determines the type of hypervisor installed on each of the clusters that the user provided at the operation 810. In some embodiments, for any cluster that has a hypervisor other than the Acropolis Hypervisor (AHV) from Nutanix, Inc., appropriate tools may be installed at operation 825 on those clusters. For example, in some embodiments, if any cluster has an ESXI hypervisor from VMWare installed, a Nutanix Guest Tool (NGT) framework may be installed on that cluster at the operation 825. Similarly, if any cluster has any other hypervisor other than AHV installed thereon, NGT framework may be installed on that cluster. Generally speaking, if any cluster does not have the desired hypervisor (whether AHV or another hypervisor) installed thereon, appropriate tools to make the other hypervisor compatible with the desired hypervisor may be installed. For example, at the operation 820, if the controller determines that either the second cluster 725 or the third cluster 730 has ESXI (or another not-desired hypervisor), the controller may install appropriate tools (e.g., NGT framework) at the operation 830 on those clusters.

Figure 9:
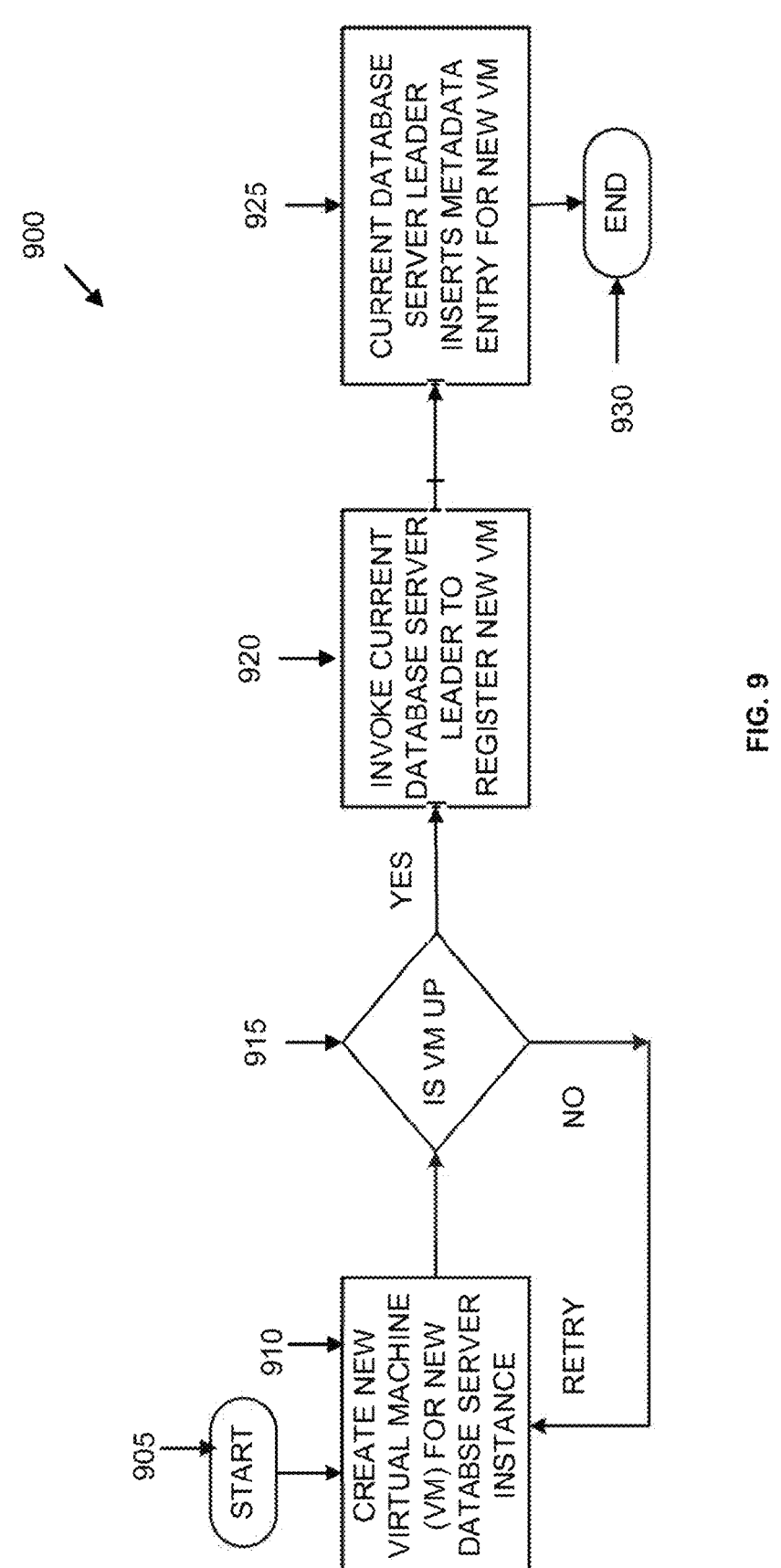
FIG. 9 is an example flowchart outlining additional operations of FIG. 8, in accordance with some embodiments of the present disclosure.

If each of the clusters have the appropriate hypervisor installed thereon at the operation 820, or if the appropriate tools have been installed on the clusters not having the appropriate hypervisor at the operation 825, the process 800 proceeds to operation 830. At the operation 830, the snapshot captured from the single instance of the database server at the operation 815 is replicated (e.g., copied) to each of the clusters selected by the user at the operation 810. At operation 835, additional instances of the database server are created on those clusters from the replicated snapshot. For example, the second instance 710 and the third instance 715 of the database server may be created from the snapshot captured from the first instance 705 of the database server. In some embodiments, one or more database virtual machines may be created on each cluster for the database server instance. At operation 840, the new database server instances may be registered with the original database server instance from which the snapshot was captured at the operation 815. For example, the second instance 710 and the third instance 715 may be registered with the first instance 705. By registering the new database server instances (e.g., the second instance 710 and the third instance 715) with the original database server instance (e.g., the first instance 705), the original database server instance is made aware of the additional database server instances running on other clusters. The registration may also elect a leader database server (e.g., primary database server). In some embodiments, the original database server instance (e.g., the first instance 705) may be designated as a leader by default. If the original database server instances goes down, a new leader may be elected. In other embodiments, the original database server instance may not be designated as a leader by default. Rather, the leader election process to elect a new leader may be run. The registration of the new database server instances is described in greater detail below in FIG. 9.

At operation 845, the proxy (e.g., the proxy 780) is configured. In the embodiments such as that of FIG. 6 where multiple proxy are used, each of those proxy may be configured at the operation 845. By configuring the proxy 780, the proxy may be configured to route user requests to the leader database server. Additionally, by configuring the proxy 780, the proxy may be configured to route requests from the leader database server to primary administration database. The configuration of the proxy is described in greater detail in FIG. 10 below. Upon configuring the proxy, at operation 850, all database server instances (e.g., the original database server instance and the newly created database server instances) are paused to prevent new requests from the user while the setup of the database server high availability is completed. In some embodiments, the instances of the database servers may be paused for a few seconds only, which time may be sufficient to complete the remaining setup of the high availability operation.

Upon pausing the database server instances, at operation 855, the database servers may be reconfigured to communicate with the proxy instead of directly with the customer databases. Specifically, before the high availability operation, the database server operates in a non-highly available manner and the single instance of the database server manages all databases provisioned (e.g., created or registered) with the associated database management system. In the non-highly available mode of operation, the single instance of the database server may be configured to communicate directly with the customer databases. With a single instance of the database server, a proxy may not be needed and direct communication may be feasible. However, when the database server is set up for high availability operations, a proxy (e.g., the proxy 780) is configured at the operation 845, and the communication between the database server and the customer databases now occurs through the proxy. Thus, all instances of the database servers may need to be reconfigured upon setting up high availability to communicate with the proxy instead of directly with the customer databases. Such a reconfiguration may occur at the operation 855. The reconfiguration is described in greater detail in FIG. 11 below.

At operation 860, the database server instances that were quiesced (e.g., paused) at the operation 850 may be unpaused to resume operation in a highly available mode upon completing reconfiguration of the databases at the operation 855. The process 800 ends at operation 865.

Figure 10:
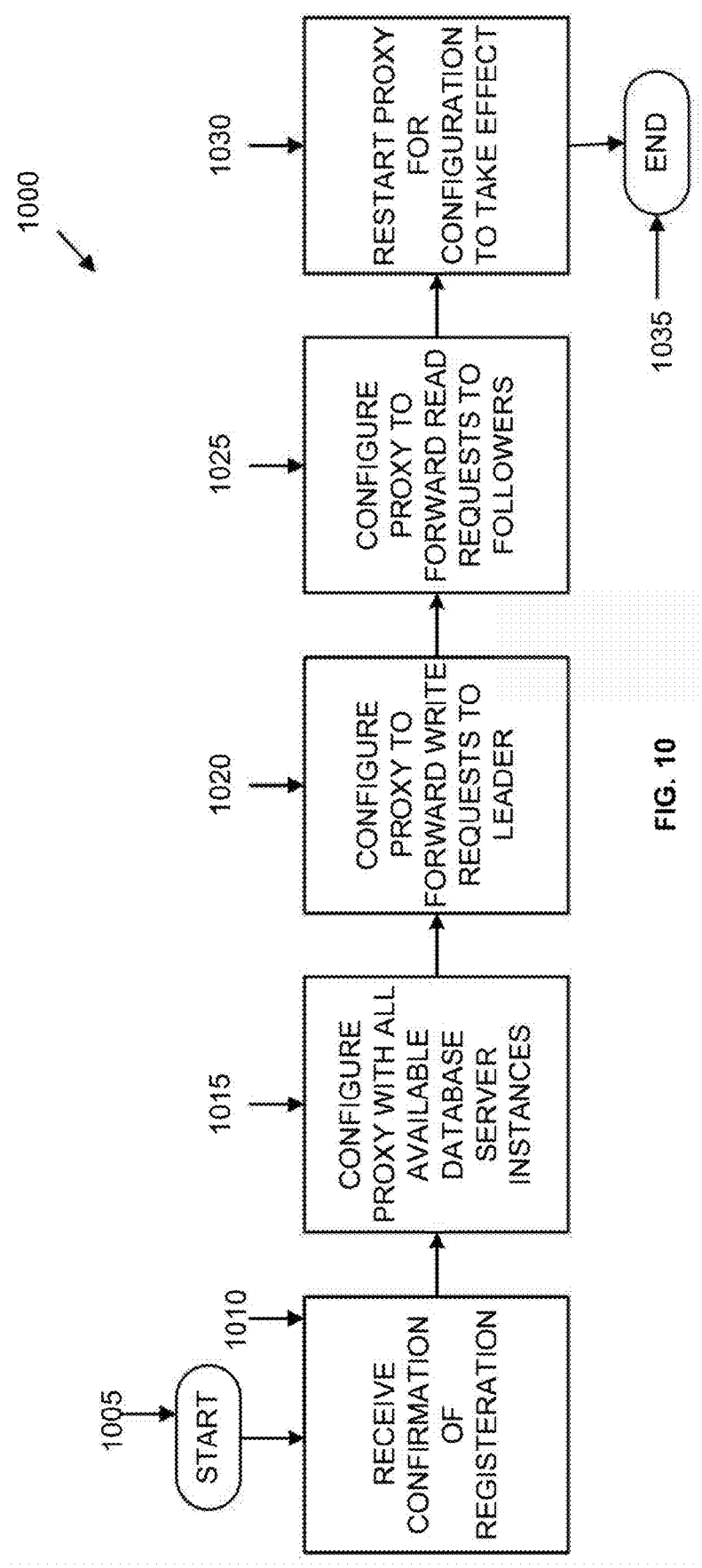
FIG. 10 is an example flowchart outlining additional operations of FIG. 8, in accordance with some embodiments of the present disclosure.

Turning now to FIG. 10, an example flowchart outlining operations of a process 900 is shown, in accordance with some embodiments of the present disclosure. The process 900 may include other or additional operations depending upon the particular embodiment. The process 900 may be performed by a controller (e.g., the processor 250) configured to enable high availability in the database server. The process 900 may be used to register each new database server instance (e.g., the second instance 710, the third instance 715) with the original database server instance (e.g., the first instance 705). Thus, the process 900, which starts at operation 905, may be performed at the operation 840 of the process 800. In some embodiments, operations 910 and 915 may be performed as part of the operation 835. Specifically and as indicated above, to create new database server instances (e.g., the second instance 710, the third instance 715), one or more new virtual machines may be created on the clusters (e.g., the second cluster 725, the third cluster 730) on which the new database server instances are to reside. In some embodiments, the one or more new virtual machines may be created by a driver or agent installed on the associated cluster. In other embodiments, other mechanisms may be used to create the new one or more virtual machines.

At the operation 915, the newly created one or more virtual machines are brought online (e.g., started). In some embodiments, if the newly created one or more virtual machines do not come online, the controller attempts, a pre-designated number of times, to bring those virtual machines online. If, after the pre-designated number of tries, the one or more virtual machines do not come online, the controller may delete the instance of the virtual machine and create another new instance of the virtual machine. The operations 910 and 915 repeat until the new one or more instances of the virtual machine are online. At operation 920, the new instances of the virtual machines are registered with the original database server. As indicated above, in some embodiments, the original instance (e.g., the first instance 705) of the database server may be configured as a leader by default. Thus, the new database server instances may be followers by default.

Every new database server instance (e.g., the second instance 710, the third instance 715) may be registered in the metadata of the leader (e.g., the first instance 705). In other words, an entry for the new database server instances may be created in the administration database of the leader. Each entry may include metadata associated with a respective one of the new database server instance. The metadata may enable the leader figure out the location of the various services (e.g., the new database server instances). The metadata may also assist with life cycle management (e.g., upgrading) of the new database server instances. The metadata may also help determine which virtual machines need to be backed up in case back up operations are enabled for those virtual machines. In some embodiments, the customer databases (e.g., the customer databases 755-765, 775) managed by the database management system (e.g., the database management system 700) may also use the metadata to get details (e.g., location, security protocols, etc.) of the new database server instances. Further, by registering the new database server instances with the leader, additional new database server instances may be created as needed and all the database server instances may be seamlessly upgraded regardless of the number of the database server instances that are running.

Thus, at operations 920 and 925, metadata for each of the new database server instances is stored within the administration database (e.g., the primary administration database). The process 900 ends at operation 930 upon adding entries in the administration database with the metadata of the new database server instances.

Referring now to FIG. 10, an example flowchart outlining operations of a process 1000 is shown, in accordance with some embodiments of the present disclosure. The process 1000 may include other or additional operations depending upon the particular embodiment. The process 1000 may be performed by a controller (e.g., the processor 250) configured to enable high availability in the database server. The process 1000 may be used to configure the proxy (e.g., the proxy 780). Thus, the process 1000 may be performed at the operation 845 of the process 800. As discussed above, proxy (e.g., API Gateway) is a layer of abstraction between a user and the database server. Without a proxy, the user directly communicates with the database server. This direct communication may be feasible in a non-highly available mode of operation when there is a single instance of the database server. However, when multiple instances of the database server exist, the user may not know which instance is the leader for sending user requests to. The proxy serves as an intermediary such that the user may simply send the user requests to the proxy and the proxy figures out the leader database server and forwards the request to the leader.

Before the proxy may be used for forwarding the user requests to the proxy, the proxy may need to be configured. In some embodiments, the configuration of the proxy may occur after the registration of the new database server instances with the leader (e.g., after the process 900). Thus, upon starting at operation 1005, the process 1000 waits to receive confirmation at operation 1010 that each of the new one or more virtual machines for each of the new database server instances has been registered with the leader. The proxy may receive confirmation via a driver or agent or any suitable mechanism.

At operation 1015, the proxy may be configured to list all available database server instances, including the leader database server instance. In some embodiments, as part of the configuration, the proxy may be set up to communicate with the consensus keeper of each instance of the database servers. By communicating with the consensus keeper, the proxy may determine which database server is the leader. In addition, as part of configuring the proxy, at operations 1020 and 1025, the proxy may be set up to forward any write operations to the leader and read operations to the followers for read balancing. By virtue of having read operations being handled by the follower database server instances, the database management system 700 may be able to handle greater number of customer requests. Thus, the follower database server instances do not simply remain on standby waiting to assume the role of a leader, but also actively participate in servicing user requests. At operation 1030, the proxy is restarted to allow the configuration of the operations 1015-1025 to take effect. The process 1000 ends at operation 1035.

Figure 11:
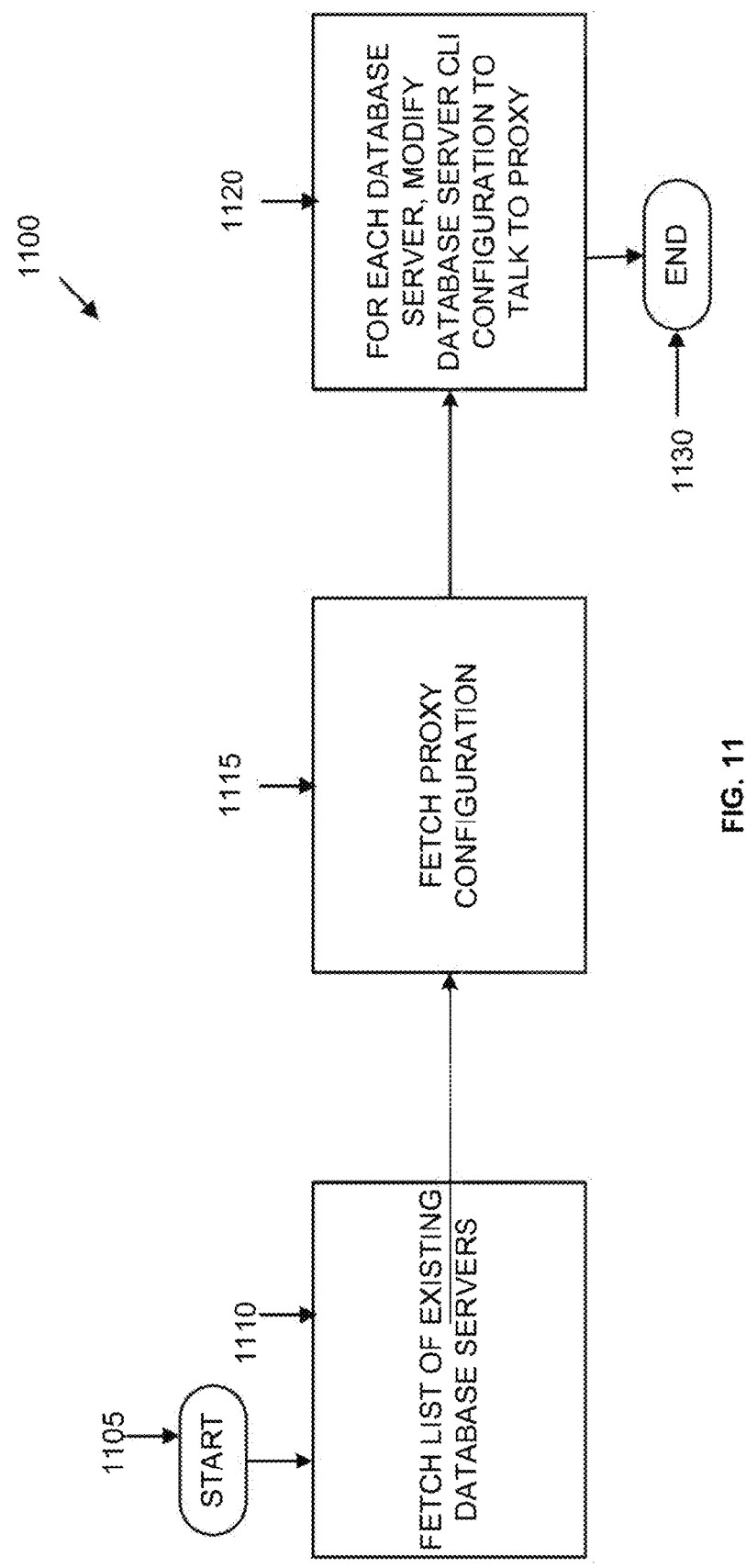
FIG. 11 is an example flowchart outlining additional operations of FIG. 8, in accordance with some embodiments of the present disclosure.

Referring now to FIG. 11, an example flowchart outlining operations of a process 1100 is shown, in accordance with some embodiments of the present disclosure. The process 1100 may include other or additional operations depending upon the particular embodiment. The process 1100 may be performed by a controller (e.g., the processor 250) configured to enable high availability in the database server. The process 1100 may be used to configure the various database server instances to communicate with the configured proxy instead of with the customer databases directly. Thus, the process 1100 may be performed at the operation 855 of the process 800. Thus, upon configuring the proxy, the database servers may be configured to establish communication between the database servers and the proxy.

Therefore, upon starting at operation 1105, the controller fetches a list, at operation 1110, of all database servers (e.g., the first instance 705, the second instance 710, and the third instance 715) in the database management system 700. In some embodiments, the list may be retrieved from the leader (e.g., using the metadata entries that were created at the time of registering the new database server instances). In other embodiments, the list may be retrieved from other locations. At operation 1115, the controller fetches the proxy configuration (e.g., network information, etc.). In some embodiments, the proxy configuration may be maintained with the leader database server from where the proxy configuration may be retrieved. In other embodiments, the proxy configuration may be retrieved from the proxy or from another location/source. At operation 1120, the controller updates the command line interface configuration of each database server to talk to the proxy. The process 1100 ends at operation 1130.

Figure 12:
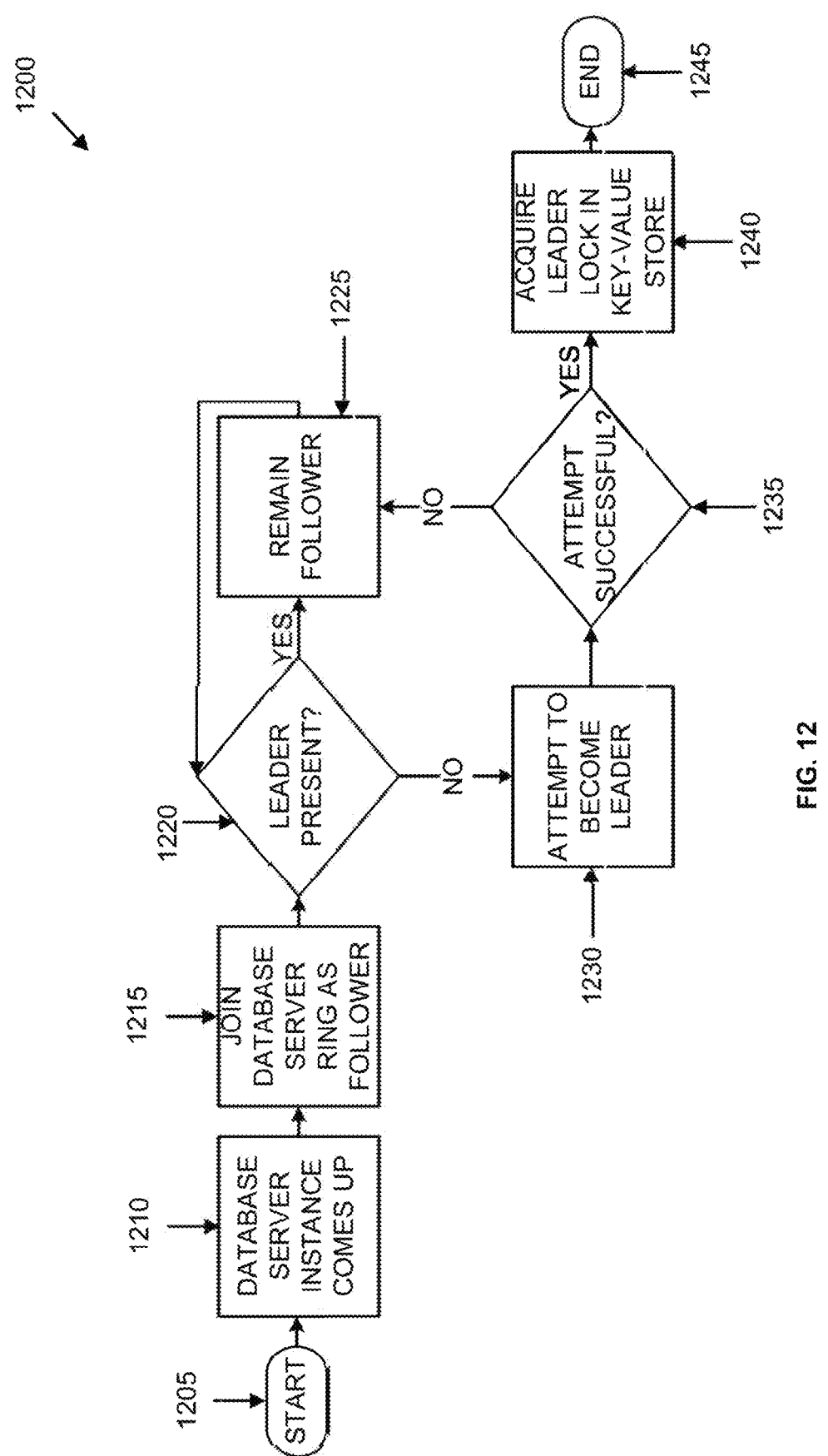
FIG. 12 is an example flowchart outlining operations for performing a consensus operation, in accordance with some embodiments of the present disclosure.
Figure 13:
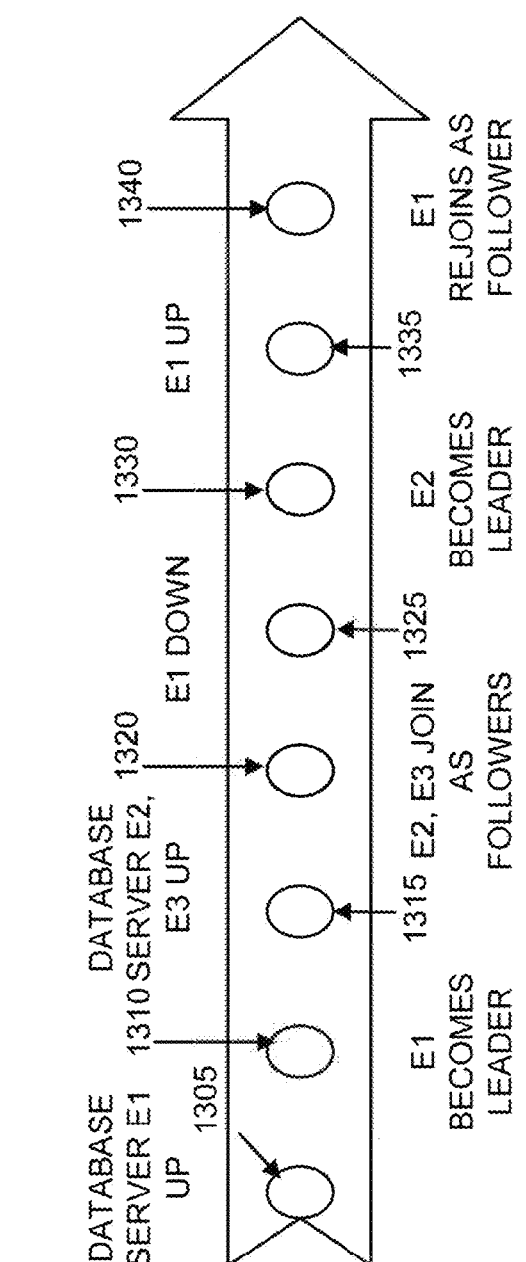
FIG. 13 is an example timeline showing the consensus operation of FIG. 12, in accordance with some embodiments of the present disclosure.

Turning now to FIGS. 12 and 13, a consensus operation is described, in accordance with some embodiments of the present disclosure. As discussed above, a consensus operation may be used to designate a leader (whether leader database server or primary administration database) in the database management system. In some embodiments, the consensus operation may be performed by a consensus keeper (e.g., ETCD). In other embodiments, the consensus keeper associated with the administration databases may elect a primary administration database for the repository and the consensus keeper associated with the database servers may be configured to elect a leader database server. In some embodiments, the same consensus keeper may elect a primary administration database for the repository as well as elect a leader database server. In some embodiments, a consensus operation need not be used for electing a primary administration database. Rather, another criteria may be used to designate administration databases as primary and secondary. FIGS. 12 and 12 below are described with respect to a consensus operation for database servers (e.g., electing leader database server). However, similar operations may be performed for elect a primary administration database for the repository.

To elect a leader for the database servers, in some embodiments, two strategies may be used: in the first strategy, all database server instances may be designated as a leader, while in the second strategy, a single database server may be designated as a leader. In a multi-leader scenario, the database management system may need to be configured such that each database server is performing pre-designated types of tasks to avoid redundant work. Thus, configuration of a multi-leader system may be more complex. However, failures may be more easily managed in a multi-leader system. For example, if one leader fails, another database server may quickly assume the responsibilities of the failed leader without needing to elect a new leader.

In a single leader system, the consensus operation may be performed to elect a leader. In some embodiments, a distributed key-value store may be used to achieve consensus. Thus, each database server (e.g., the first instance 705, the second instance 710, the third instance 715) in the database management system may be associated (e.g., interface) with a consensus keeper, and each consensus keeper may participate in the leader election. An instance of the database server may become a leader by grabbing a distributed lock in the key-value store. All other instances of the database servers may track the status of the leader lock. When the leader releases the lock, either by relinquishing leadership or by failing, the other instances of the database servers may start a new round of leader election.

Thus, FIG. 12 shows a flowchart outlining a process 1200 for electing a leader, in accordance with some embodiments of the present disclosure. The process 1200 may include other or additional operations depending upon the particular embodiment. The process 1200 may be performed by a controller (e.g., the processor 250) associated with the consensus keeper. The process 1200 may be used to elect a leader database server. The process 1200 may similarly be used for electing a primary administration database. In some embodiments, the process 1200 may be performed each time a new database server instance is added. In other embodiments, the process 1200 may be performed periodically or upon satisfaction of certain conditions.

Thus, upon starting at operation 1205, the controller determines at operation 1210 that a new database server instance (e.g., the second instance 710, the third instance 715) has been added to the database management system (e.g., the database management system 700). As indicated above, in some embodiments, the new database server instances may be configured to join as followers, while the original database server instance (e.g., the first instance 705) may serve as a leader. Thus, in such embodiments, upon determining that a new database server instance has been added, the controller may add the new database server instance to the group of database server instances. The controller adds the new database server instance as a follower at operation 1215.

In some embodiments, each database server instance may be associated with a value of "true" or "false." If the value for a particular database server instance is set to "true," that database server instance may be considered a leader. If the value for a particular database server instance is set to "false," that database server instance may be considered a follower. In other embodiments, other mechanisms may be used to distinguish between a leader and a follower database server instance. At operation 1220, the controller determines whether a leader is already present between the various database server instances. Specifically, in some embodiments, the controller may determine whether the value is set to "true" for another database server instance. If the controller finds a leader at the operation 1220, the process 1200 proceeds to operation 1225 where no change in leadership is made and the new database server instance that was determined to be added at the operation 1210 continues to remain a follower. The controller may be configured to periodically poll the various database server instances in the database management system to monitor for a leader. Thus, after the operation 1225, the controller loops back to the operation 1220 to continue monitoring for a leader.

If, at the operation 1220 the controller determines that there is no leader database server instance in the database management system, the process 1200 proceeds to operation 1230 where the database server instance that was determined to be added at the operation 1210 and the other follower database server instances attempt to become a leader. At operation 1235, the controller determines if any of those database server instances successfully becomes a leader (e.g., by grabbing the lock), and if so, at operation 1240 that database server instance acquires the lock in the key-value store to be designated as the leader, and the process 1200 ends at operation 1245. On the other hand, if at the operation 1235, neither database server instance that was determined to be added at the operation 1210 nor any of the other follower database server instances managed to become a leader, the controller loops back to the operation 1225 where the controller continues to designate the database server instances that attempted at the operation 1230 to remain as followers. The controller then tries again to elect a leader after a delay (e.g., after 1 second). The process continues until the controller successfully elects a leader.

Turning now to FIG. 13, an example state transition timeline 1300 for the consensus process is shown, In accordance with some embodiments of the present disclosure. At time 1305, the original database server instance E1 (e.g., the first instance 705) is set up. At time 1310, which is after the time 1305, the original database server instance E1 is designated as the leader. At this time the original database server instance E1 is the only database server in the database management system. At time 1315, which is after the time 1310, new database server instances E2 and E3 may be added (e.g., because high availability is set up). As indicated at time 1320, the new database server instances E2 and E3 join as followers. At time 1325, which is after the time 1320, the leader (e.g., the original database server instance E1)

goes down. At time 1330, which is after the time 1325, one of the two new database server instances E2 or E3 becomes the new leader. For example, the timeline 1300 shows the new database server instance E2 as becoming the leader at the time 1330. At time 1335, which is after the time 1330, the original database server instance E1 comes back up. In such cases, the original database server instance E1 is not re-designated as the leader. Rather, and as shown at time 1340, which is after the time 1335, the original database server instance enters as a follower. When the new leader (e.g., the database server instance E2) goes down, another leader may be selected, and the original database server instance may attempt to become the leader again.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
   a highly available database server comprising a processor and a memory, the highly available database server including:
   a first instance of the database server in a first availability zone of a virtual computing system; and
   a second instance of the database server in a second availability zone of the virtual computing system different from the first availability zone;
   a highly available administration database including:
   a first instance of an administration database in a third availability zone, wherein the first instance of the administration database is configured to store metadata and configuration data for managing at least one customer database; and
   a second instance of the administration database in a fourth availability zone different from the third availability zone, wherein the second instance of the administration database is synchronized with the first instance of the administration database to maintain consistency of metadata and configuration data,
   wherein the highly available database server and the highly available administration database are configured to manage at least one customer database,
   wherein the first instance of the database server is located on a first virtual entity in the first availability zone and the first instance of the administration database is located on a second virtual entity in the third availability zone; and a first proxy in the first availability zone to facilitate communication between a leader database server and the highly available administration database, wherein the leader database server is selected from the first instance of the database server and the second instance of the database server.

2. The system of claim 1, wherein the third availability zone is the first availability zone, and wherein the fourth availability zone is the second availability zone.

3. The system of claim 1, wherein the third availability zone is one of the first availability zone, the second availability zone, and an additional availability zone.

4. The system of claim 1, further comprising:

a second proxy in the second availability zone to facilitate communication between a leader database server and the administration database when the first proxy fails.

5. The system of claim 1, wherein the first instance of the database server is a primary database server and the second instance of the database server is a secondary database server, and wherein the second instance of the database server becomes the primary database server upon the first instance of the database server becoming unavailable.

6. The system of claim 1, further comprising a consensus keeper configured to record state transitions in the first instance of the administration database and the second instance of the administration database.

7. The system of claim 2, wherein the highly available database server and the highly available administration database are configured to redirect database management operations to ensure continuity in response to failure conditions in any availability zone.

8. The system of claim 1, wherein resource allocation for the first and second instances of the database server and administration database is dynamically adjusted based on system load or failure conditions.

9. A method comprising:

creating a highly available database server by:

creating a first instance of the database server in a first availability zone of a virtual computing system; and creating a second instance of the database server in a second availability zone of the virtual computing system different from the first availability zone; creating a highly available administration database by:

creating a first instance of an administration database in a third availability zone, wherein the first instance of the administration database is configured to store metadata and configuration data for managing at least one customer database;

creating a second instance of the administration database in a fourth availability zone different from the third availability zone, wherein the second instance of the administration database is synchronized with the first instance of the administration database to maintain consistency of metadata and configuration data, wherein the highly available database server and the highly available administration database are configured to manage at least one customer database, wherein the first instance of the database server is located on a first virtual entity in the first availability zone and the first instance of the administration database is located on a second virtual entity in the third availability zone; and creating a first proxy in the first availability zone to facilitate communication between a leader database server and the highly available administration database, wherein the leader database server is selected from the first instance of the database server and the second instance of the database server.

10. The method of claim 9, wherein the third availability zone is the first availability zone, and wherein the fourth availability zone is the second availability zone.

11. The method of claim 9, wherein the third availability zone is one of the first availability zone, the second availability zone, and an additional availability zone.

12. The method of claim 9, further comprising:

creating a second proxy in the second availability zone to facilitate communication between a leader database server and the administration database when the first proxy fails.

13. The method of claim 9, wherein the first instance of the database server is a primary database server and the second instance of the database server is a secondary database server, wherein the second instance of the database server becomes the primary database server upon the first instance of the database server becoming unavailable.

14. The method of claim 9, further comprising creating a consensus keeper configured to record state transitions in the first instance of the administration database and the second instance of the administration database.

15. The method of claim 9, further comprising redirecting database management operations to ensure continuity in response to failure conditions in any availability zone.

16. The method of claim 9, wherein resource allocation for the first and second instances of the database server and administration database is dynamically adjusted based on system load or failure conditions.

17. A non-transitory, computer-readable medium comprising computer-readable instructions stored thereon that when executed by one or more processors cause the one or more processors to:

create a highly available database server by:

creating a first instance of the database server in a first availability zone of a virtual computing system; and creating a second instance of the database server in a second availability zone of the virtual computing system different from the first availability zone;

create a highly available administration database by:

creating a first instance of an administration database in a third availability zone, wherein the first instance of the administration database is configured to store metadata and configuration data for managing at least one customer database;

creating a second instance of the administration database in a fourth availability zone different from the third availability zone, wherein the second instance of the administration database is synchronized with the first instance of the administration database to maintain consistency of metadata and configuration data;

wherein the highly available database server and the highly available administration database are configured to manage at least one customer database, wherein the first instance of the database server is located on a first virtual entity in the first availability zone and the first instance of the administration database is located on a second virtual entity in the third availability zone; and create a first proxy in the first availability zone to facilitate communication between a leader database server and the highly available administration database, wherein the leader database server is selected from the first instance of the database server and the second instance of the database server.

18. The non-transitory, computer-readable medium of claim 17, wherein the third availability zone is the first availability zone, and wherein the fourth availability zone is the second availability zone.

19. The non-transitory, computer-readable medium of claim 17, wherein the third availability zone is one of the first availability zone, the second availability zone, and an additional availability zone.

20. The non-transitory, computer-readable medium of claim 17, wherein the instructions cause the one or more processors to:

create a second proxy in the second availability zone to facilitate communication between a leader database server and the administration database when the first proxy fails.

21. The non-transitory, computer-readable medium of claim 17, wherein the first instance of the database server is a primary database server and the second instance of the database server is a secondary database server, wherein the second instance of the database server becomes the primary database server upon the first instance of the database server becoming unavailable.

22. The non-transitory, computer-readable medium of claim 17, wherein the instructions cause the one or more processors to create a consensus keeper configured to record state transitions in the first instance of the administration database and the second instance of the administration database.

\* \* \* \* \*